(12) United States Patent
Bodurka

(10) Patent No.: US 12,508,180 B2
(45) Date of Patent: Dec. 30, 2025

(54) PATIENT CARE SYSTEM WITH UNAUTHORIZED USE DETECTION

(71) Applicant: Stryker Corporation, Kalamazoo, MI (US)

(72) Inventor: Alexander Josef Bodurka, Portage, MI (US)

(73) Assignee: Stryker Corporation, Portage, MI (US)

( * ) Notice: Subject to any disclaimer, the term of this patent is extended or adjusted under 35 U.S.C. 154(b) by 437 days.

(21) Appl. No.: 18/008,861

(22) PCT Filed: Aug. 11, 2021

(86) PCT No.: PCT/US2021/045542
§ 371 (c)(1),
(2) Date: Dec. 7, 2022

(87) PCT Pub. No.: WO2022/051069
PCT Pub. Date: Mar. 10, 2022

(65) Prior Publication Data
US 2023/0233388 A1    Jul. 27, 2023

Related U.S. Application Data

(60) Provisional application No. 63/073,008, filed on Sep. 1, 2020.

(51) Int. Cl.
*A61G 7/018*    (2006.01)
*G05B 15/02*   (2006.01)
*G16H 40/63*   (2018.01)

(52) U.S. Cl.
CPC ............. *A61G 7/018* (2013.01); *G05B 15/02* (2013.01); *G16H 40/63* (2018.01); *A61G 2203/20* (2013.01)

(58) Field of Classification Search
CPC ........ A61G 7/012; A61G 7/015; A61G 7/018; A61G 7/05; A61G 7/0524; A61G 2203/32; G16H 40/63; G16H 40/67; G05B 15/02; G06F 9/4411; G06F 9/451
USPC .............................................. 700/275; 5/616
See application file for complete search history.

(56) References Cited

U.S. PATENT DOCUMENTS

| | | | |
|---|---|---|---|
| 9,782,005 B2 | 10/2017 | Paul et al. | |
| 10,391,019 B2 | 8/2019 | Stryker | |
| 10,667,984 B2 | 6/2020 | Brosnan et al. | |
| 10,757,228 B1 | 8/2020 | Bhimavarapu et al. | |
| 10,910,888 B2 * | 2/2021 | Patmore ................... | A61G 7/05 |
| 10,939,872 B2 | 3/2021 | George et al. | |
| 11,251,663 B2 * | 2/2022 | Patmore ................ | H02J 7/0044 |
| 11,355,236 B2 | 6/2022 | Bodurka et al. | |

(Continued)

FOREIGN PATENT DOCUMENTS

CA      2975441 C   * 12/2020   ......... G06F 21/6245

*Primary Examiner* — Crystal J Barnes-Bullock
(74) *Attorney, Agent, or Firm* — Gardner, Linn, Burkhart & Ondersma LLP

(57) ABSTRACT

A system and method to detect an unauthorized device coupled to an interface of a control system for a patient support apparatus. The interface may be wired or wireless, and the system and method may involve determining an operating signature of a device coupled to an interface. Based on the operating signature being consistent with a device signature stored in memory, the system may determine the device coupled to the interface is an authorized device.

19 Claims, 9 Drawing Sheets

(56) References Cited

U.S. PATENT DOCUMENTS

| | | | |
|---|---|---|---|
| 11,410,771 B2* | 8/2022 | Bhimavarapu | G06F 9/451 |
| 11,646,609 B2* | 5/2023 | Patmore | A61G 7/08 |
| | | | 307/104 |
| 11,651,854 B2 | 5/2023 | Brosnan et al. | |
| 2022/0270754 A1* | 8/2022 | Bodurka | G16H 40/67 |
| 2023/0238837 A1* | 7/2023 | Patmore | H02J 50/90 |
| | | | 307/104 |

* cited by examiner

| Profile | | Services | Function |
|---|---|---|---|
| 175b<br>Left Siderail | 177b | Bed Motion | up motion<br>down motion<br>fowler<br>gatch |
| | 177d | Nurse Call | nurse call button<br>nurse answer light<br>nurse call light |
| | 177e | TV Controls | channel up<br>channel down<br>volume up<br>volume down<br>power<br>mute |
| 175c<br>Right Siderail | 177f | Bed Motion | up motion<br>down motion<br>fowler<br>gatch |
| | 177h | Nurse Call | nurse call button<br>nurse answer light<br>nurse call light |
| | 177i | TV Controls | channel up<br>channel down<br>volume up<br>volume down<br>power<br>mute |
| 175d<br>Footboard | 177j | WiFi | bed exit status<br>nurse call status<br>patient weight<br>battery status<br>mattress therapy status<br>start therapy command |
| | 177k | Bed Motion | up motion<br>down motion<br>fowler<br>gatch |
| | 177l | Bed Configuration | smart tv enable<br>power mattress enable<br>scale configuration |
| 175e<br>RIB Bed Unit | 177m | Bluetooth | remote 37pin status/control<br>TV audio<br>Nurse call audio |
| | 177n | Infrared | BBID<br>Battery Status<br>Nurse Call Redundancy |
| | 177o | Headwall | local 37pin status/control |
| 175f<br>RIB Wall Unit | 177p | Bluetooth | remote 37pin status/control<br>TV audio<br>Nurse Call audio |
| | 177q | Infrared | BBID<br>Battery Status<br>Nurse Call Redundancy |
| | 177r | Headwall | local 37pin status/control |
| | 177s | Power | backup battery status<br>AC power status |

CAN (Current)

| 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|----|----|----|----|----|----|----|----|----|----|----|----|----|----|----|----|----|----|----|----|---|---|---|---|---|---|---|---|---|
| PRIORITY | | | FORMAT | | | | | | | | | | | FRAME | | | | | | | | | | SNA | | | | |

PRIORITY

| | | | |
|---|---|---|---|
| 0 | 0 | 0 | 0 - Highest |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 - Lowest |

FORMAT

| | | |
|---|---|---|
| 0 | 0 | Cortex Product Format |
| 0 | 1 | Cortex Library Format |
| 1 | 0 | Reserved Format 0 |
| 1 | 1 | Reserved Format 1 |

SNA / DNA

| | |
|---|---|
| 0x00-0xFE | Product Node Address |
| 0xFF | Broadcast Address |

| | |
|---|---|
| SNA | Source Node Address |
| DNA | Destination Node Address |
| MID | Message Identification |

Product / Cortex Frame

| 24 | 23 | 22 | 21 | 20 | 19 | 18 | 17 | 16 | 15 | 14 | 13 | 12 | 11 | 10 | 9 |
|----|----|----|----|----|----|----|----|----|----|----|----|----|----|----|---|
| MID | | | | | | | | | | DNA | | | | | |

FIG. 8

CAN MIDs (Current)

Cortex Library MIDs

| MID | Assignment |
|---|---|
| 0x00 | SDCCP Protocol Version Request |
| 0x01 | SDCCP Protocol Version Response |
| 0x02 | SDCCP Property List Request |
| 0x03 | SDCCP Property List Response |
| 0x04 | SDCCP Get Value Request |
| 0x05 | SDCCP Get Value Response |
| 0x06 | SDCCP Set Value Request |
| 0x07 | SDCCP Set Value Response |
| 0x08 | SDCCP Get Range Request |
| 0x09 | SDCCP Get Range Response |
| 0x0A | SDCCP Subscribe Request |
| 0x0B | SDCCP Subscribe Response |
| 0x0C | SDCCP Unsubscribe Request |
| 0x0D | SDCCP Unsubscribe Response |
| 0x0E | SDCCP Renew Subscription Request |
| 0x0F | SDCCP Renew Subscription Response |
| 0x10 | SDCCP Reserved |
| 0x11 | SDCCP Subscription Stream |
| 0x12-0x1F | SDCCP Reserved |
| 0x20-0x7F | Reserved |
| 0x80 | Transport Protocol - Control |
| 0x81 | Transport Protocol - Transfer |
| 0x82 | Stryker Message (SMRP, SDCCP, etc.) |
| 0x83-0xFF | Reserved |

Cortex Product MIDs

| MID | Assignment |
|---|---|
| 0x00-0xFF | Reserved for Product Use |

FIG. 9

PATIENT CARE SYSTEM WITH UNAUTHORIZED USE DETECTION

TECHNICAL FIELD

The present application relates to patient support apparatuses, such as, but not limited to, beds, cots, stretchers, recliners, chairs, and the like; and more particularly to detecting unauthorized components connected to the patient support apparatus.

BACKGROUND

Conventional patient support apparatuses often utilize a large number of microcontrollers, actuators, motors, and other electrical components. In many cases, these devices are connected to a main control system via a connector. These connectors can also be used as an attack vector for an unauthorized device. For instance, the connector may provide access to a network bus, such as a CAN bus, which an unauthorized device may utilize to communicate unauthorized commands to another component of the patient support apparatus. The connector may be capable of supplying power and include a discrete input or output that can be used by an unauthorized device to initiate an unauthorized command or falsely indicate a state of the patient support apparatus to the main control system.

SUMMARY OF THE DESCRIPTION

The present disclosure is directed to a system and method provided to detect an unauthorized device coupled to an interface of a control system for a patent support apparatus. The interface may be wired or wireless, and the system and method may involve determining an operating signature of a device coupled to an interface. Based on the operating signature being consistent with a device signature stored in memory, the system may determine the device coupled to the interface is an authorized device. However, if the operating signature does not correspond to a device signature stored in memory, the system may determine the device is unauthorized. Mitigation steps, such as disabling the interface or entering a fault mode, or both, may be initiated in response to detection of an unauthorized device being coupled to an interface of the control system.

In one embodiment, a patient support apparatus is provided with a litter frame, a support deck supported on the litter frame and adapted to support a patient thereon, and a power source adapted to provide power to the patient support apparatus. The patient support apparatus may include a peripheral device adapted to control a state of the patient support apparatus, the peripheral device having an operative signature. The patient support apparatus may include a control system operatively coupled to the peripheral device, and adapted to receive electrical power from the power source. The control system adapted to determine the peripheral device is authorized for the patient support apparatus based on the operative signature corresponding to a baseline operative signature stored in memory.

In one embodiment, a patient support apparatus is provided with a litter frame, a support deck supported on the litter frame and adapted to support a patient thereon, and a power source adapted to provide power to the patient support apparatus. The patient support apparatus may include a peripheral device connector adapted provide a connection to a peripheral device, where the peripheral device is operable to control a state of the patient support apparatus, and where the peripheral device is associated with a peripheral device signature.

The patient support apparatus may include a control system operatively coupled to the peripheral device connector, and adapted to receive electrical power from the power source. The control system may be adapted to obtain an operative signature associated with a device connected to the peripheral device connector, and to determine the device is not authorized with respect to the patient support apparatus based on the operative signature failing to correspond to a baseline operative signature stored in memory of the control system.

In one embodiment, a patient support apparatus may include a litter frame, a support deck supported on the litter frame and adapted to support a patient thereon, a plurality of motorized actuators adapted to move a plurality of components of the patient support apparatus, a user interface including a display for displaying information to a user, and a main control board including a main controller.

The patient support apparatus may include a mattress control board adapted to control a mattress positioned on top of the support deck, where the mattress control board includes a mattress microcontroller and a mattress transceiver adapted to receive messages from the main control board used to control the mattress. The patient support apparatus may include a motion control board adapted to control movement of the plurality of motorized actuators, where the motion control board includes a motion microcontroller (e.g., a motor microcontroller) and a motion transceiver adapted to receive messages from the main control board used to control the plurality of motorized actuators.

The patient support apparatus may include a display control board adapted to control content displayed on the display of the user interface, where the display control board includes a display microcontroller and a display transceiver adapted to receive messages from the main control board used to control the display.

The main controller may be operable to determine a mattress control board signature, a motion control board signature, and a display control board signature respectively for the mattress control board, the motion control board, and the display control board, where the main controller is operable to determine the mattress control board, the motion control board, and the display control board are authorized devices for the patient support apparatus based on each of the mattress control board signature, the motion control board signature, and the display control board signature corresponding to at least one of a plurality of baseline signatures stored in memory.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 7 shows a plurality of stored device signatures in accordance with one embodiment.

FIG. 8 depicts characteristic data for a device data signature in accordance with one embodiment.

FIG. 9 shows additional aspects of the characteristic data of FIG. 8.

DESCRIPTION

Figure 1:
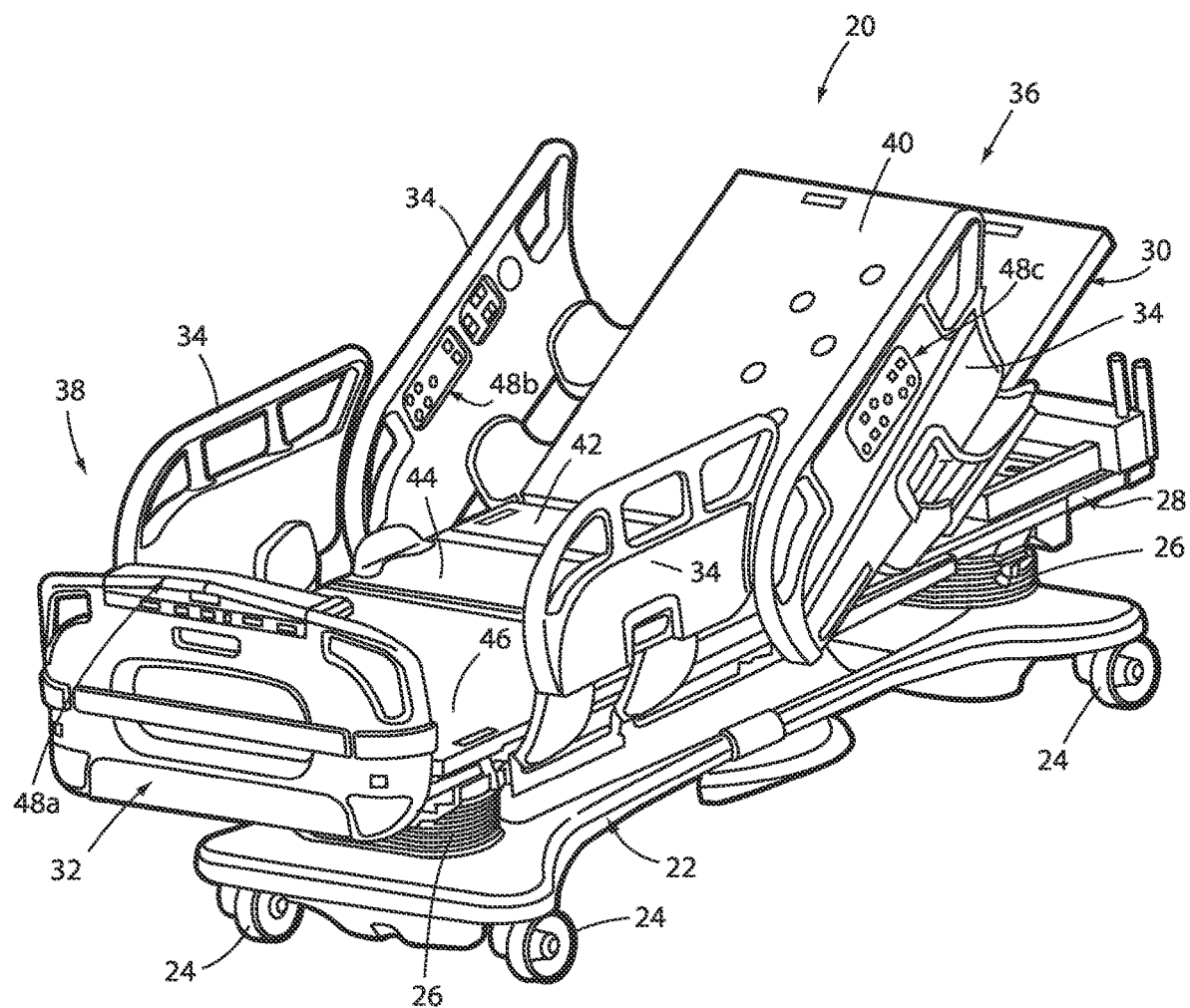
FIG. 1 shows a perspective view of a patient support apparatus in accordance with one embodiment of the present disclosure.

A system and method in accordance with one embodiment are provided to detect an unauthorized device coupled to an interface of a control system for a patient support apparatus. The interface may be wired or wireless, and the system and method may involve determining an operating signature of a device coupled to an interface. Based on the operating signature being consistent with a device signature stored in memory, the system may determine the device coupled to the interface is an authorized device. However, if the operating signature does not correspond to a device signature stored in memory, the system may determine the device is unauthorized. Mitigation steps, such as disabling the interface or entering a fault mode, or both, may be initiated in response to detection of an unauthorized device being coupled to an interface of the control system.

For purposes of disclosure the control system and the patient support system described herein are provided with multiple components and described in conjunction with several alternative configurations. It is to be understood that any component and/or function of a component of the control system and/or patient support system in one embodiment may be provided in an alternative embodiment described herein, and that any such component and/or function of a component may be absent from any embodiment described herein.

The control system for the patient support apparatus may include interfaces that supply power at connectors for subsystems/devices within or external to the control system. When these connections (e.g., ports) are exposed on the exterior of the patient support apparatus or related component, there is a possibility for an unknown/unwanted device to connect to the control system. For instance, if an unknown or unwanted device has a matching connector for the interface, or a configuration capable of connecting to contacts of the interface, the unknown or unwanted device may be able to start drawing energy and potentially even communicating on any available data lines provided by the interface. In certain scenarios such an unauthorized connection to an interface of the control system can lead to issues where fuses or circuit breakers trip, a battery for the control system becomes drained, overheating issues, or other issues that can result from excess power draw from the patient support apparatus, or a combination thereof. Detection of excess power draw inconsistent with a device signature, including a device signature associated with a specific interface, may enable the control system to take mitigation steps, such as disabling the interface or power delivery to the interface, to prevent issues related to excessive power draw.

Additionally, or alternative, if an interface provides communication capabilities, an unwanted or unauthorized device may gain unauthorized communication access. For instance, if the interface has data lines on an exposed connector, cyber-security or other security risks may arise through the unauthorized device's access to the active data lines. The power load profile, or a portion of the power load profile, of an authorized device (possibly an authorized device for a specific interface) may be sufficiently unique or identifiable that the power load profile or signature may be stored in memory and compared against an operating signature sensed by the control system to determine the authorized device is actually authorized for connection to an interface of the control system. In one embodiment, the power load profile may provide the basis for identification, an encryption key, or authentication for the communication, or any combination thereof.

It is noted that the stored or operating signature described herein may be based on dynamic operation. For instance, the stored or operating signature may be indicative of specific communications or a power demand (e.g., steady state, an increase, or a decrease, or a combination thereof) associated with a mode of operating that is initiated in response to a directive to do so. The timing of power delivery related to initiation of the operating mode may be indicative of an identity of the device and form part of a stored or operating signature of the device.

In an embodiment in which the power load profile provides an encryption key or validation criteria for authentication, or both, the control system may receive communications from the device and decrypt or validate a digital signature of such communications based on a key or data derived from the power load profile of the device. Additionally, or alternatively, the control system may encrypt or digitally sign communications directed toward the device based on a key or data derived from the power load profile of the device, and the device may decrypt or validate the communications using a key or data stored in memory of the device and corresponding to the device's power load profile.

In one embodiment, the control system or a device thereof may be operable to generate credentials or passkeys, or both, based on a device signature (e.g., a load profile) for the communication with another device or between two devices. For instance, the load profile, or portion of it, can form an operating signature of a device and can be used to identify a particular device as described herein. The operating signature may form the basis for generating a key that is used for the communication between devices. Alternatively, or additionally, encrypted information (such as information encrypted by a shared secret [pairing key]) may be generated and sent by monitoring the load profile at a certain point in time or period of time. The pattern that occurs at that point in time or period of time may form the basis for generating an encryption or pairing key that is used for the communication between the devices.

In one embodiment, by determining correspondence between an operating signature and a stored signature, a subsystem of the control system may identify another subsystem that has connected to the control system interface, such as an interface having a connector with power and data. The subsystem may identify whom/what device it is communicating with in this manner.

The control system in accordance with one embodiment of the present disclosure may include monitoring of power draw that is supplied to other external devices (e.g., PCBs, subsystems, system, or another product) via a connector of an interface. In one embodiment, every authorized device in the system may have a load profile or signature that is sufficiently unique or identifiable with respect to each respective device's application and the design configuration. The control system may identify individual devices, or types of device (i.e., TV, motor, A/C unit) by sensing their power demands to form an operating signature associated with the device and comparing the operating signature to a device signature stored in memory.

In one embodiment, an operating signature of a device, such as a load profile or portion of the load profile, can be used to identify authorized products connected to the control system. For example, it is possible that every SYK device has a requirement that at a certain time during power up it must perform an action that creates a certain pattern in the load profile. This can be used to identify if the connected device is an authorized device.

The control system may be configured in one embodiment to allow only certain types of devices to receive power, and identification of authorized devices or types of devices may be conducted based on an operating signature of a device. For example, if the control system has a connection that is only supposed to be used with an IV pump, the control system may identify if a device is not an IV pump and if that is the case, turn off the power for that port.

In one embodiment, identification of an authorized device or an unauthorized device may facilitate enhancing cybersecurity or communications security. For instance, the control system may include an external USB port, as described herein that is intended for patients to charge their devices. However, the external USB port may also have data lines and can be used by technicians for troubleshooting issues in the field. Conventional attack vectors include connecting a USB device or thumb drive to a target or a device that is connected to the target. To protect against this attack vector, when a load profile of a USB device is detected and considered to correspond to an unauthorized device, the data for the external USB port can be shut off to prevent a potential attack from occurring.

In one embodiment, identification of authorized and unauthorized devices may facilitate avoidance of failures due to connection of an unauthorized device or an authorized device that is malfunctioning or operating outside its nominal operating parameters. For instance, by knowing how a device (or type of device) uses power in normal operating conditions, and storing this information as a device signature associated with the device or type of device, the control system may detect a failure in the device when the load profile or an operating signature does not correspond to the stored signature. For example, if an IV pump is connected and the current draw for when the IV pump is higher than expected, this discrepancy may mean the motor of the IV pump is going bad and should be replaced. Detecting malfunctions based on comparisons between an operating signature and a stored signature may enable the control system to protect against any potential damage that could occur if a malfunctioning device were connected to the control system when the malfunctioning device fails.

In one embodiment, identification of authorized and unauthorized devices connected to an interface may enable the control system to be used to detect if a device is connected to the wrong interface. For example, if a subsystem that is supposed to be connected to Port 1 and a device connected on that port does not have the correct start up pattern or signature, the control system may shut down the power to that port and display an error. This mode of operation may help to protect the patient support apparatus and potentially the subsystem from any failures that could occur by connecting the wrong device to the wrong port.

It is noted that new types of security threats can materialize daily. This can in some circumstances increase cost and complexity of the control system in order to substantially avoid unknown threats, perhaps even undiscovered threats. It is also sometimes not practical to configure the control system to be protected against every known threat when the probabilities of those threats are determined to be very low. One embodiment according to the present disclosure involves an approach that may not protect against any specific threat but enables the control system to detect that an attack may be happening on an interface, allowing the control system to report the threat immediately and then take action if considered necessary.

For instance, as discussed herein, one embodiment of the present disclosure may involve monitoring for abnormal behavior or communications on an interface (e.g., WiFi, Bluetooth, CAN, UART, USB). If any abnormal behavior is detected, the control system may report such abnormal behavior.

A device in or connected to the control system or a controller (e.g., a human, or another application) may decide based on the report what action to take. In one embodiment, abnormal behavior may be detected without additional hardware and operates effectively against unknown threats that arise in the future. Device signatures, including, for example, data structures and subsystem level device profiles, may be provided to achieve this functionality. Each device (e.g., a subsystem) that has a communication interface may have what is considered a "device profile" or "a device signature". This profile may define a total solution for the device, such as the behavior and use cases for the device. A profile may include one or more services, each of which may be a collection of characteristics (data), relationships to other services and attributes (e.g., frequency, timing, and data ranges) that make up the behavior of a certain function of the device. Frequency may include a frequency of a particular command, and timing may pertain to the sequence of communication and timing with respect to steps of the sequence. For instance, with respect to a directive to the propulsion control board to go forward, the data profile may include information indicating an expectation to receive five of such directives in a row preceded by an encoder value associated with the directive. If an operating data profile obtained by the profile monitor includes similar information but not corresponding to a stored data profile for such directives from a system or device connected to an interface of the control system, the profile monitor may identify the device as being unauthorized.

By breaking down the behavior of each subsystem to this level, the control system may be able to compare a stored signature of a device against an actual operating signature of the device, and to detect a possible threat by looking for abnormal behaviors in a particular device's service or signature. In one embodiment, an attacker would have to know every behavior about the device in order to not be detected, which is a very low probability. The control system may be implemented in conjunction with both embedded products and server-based applications.

It is noted that, for purposes of disclosure, a control system including a profile monitor is provided in conjunction with a patient support apparatus. However, it is to be understood that the present disclosure is not so limited. The control system or aspects thereof, including for instance a profile monitor for one or more interfaces, may be implemented in conjunction with control systems separate from a patient support apparatus and/or outside the realm of health care.

I. System Overview

A patient support apparatus 20 according to one embodiment of the present disclosure is shown in FIG. 1. Although the particular form of patient support apparatus 20 illustrated in FIG. 1 is a bed adapted for use in a hospital or other medical setting, it will be understood that the patient support apparatus 20 may, in different embodiments, be a cot, a stretcher, a gurney, a recliner, or any other structure capable of supporting a patient that may be used during times when the patient is not accompanied by a caregiver. For purposes of the following written description, the patient support apparatus 20 will be described as a bed with the understanding the following written description applies to these other types of patient support apparatuses.

In general, the patient support apparatus 20 includes a base 22 having a plurality of wheels 24, a lift subsystem comprising a pair of lifts 26 supported on the base, a litter frame 28 supported on the lifts 26, and a support deck 30 supported on the litter frame 28. The patient support apparatus 20 includes a headboard (not shown), a footboard 32, and a plurality of siderails 34. The siderails 34 are all shown in a raised position in FIG. 1 but are each individually movable to a lower position, in which ingress into, and egress out of, the patient support apparatus 20 is not obstructed by the lowered siderails 34. In some embodiments, the siderails 34 may be moved to one or more intermediate positions as well.

The lifts 26 are adapted to raise and lower the litter frame 28 with respect to the base 22. The lifts 26 may be hydraulic actuators, electric actuators, or any other suitable device for raising and lowering the litter frame 28 with respect to the base 22. In the illustrated embodiment, the lifts 26 are operable independently so that the tilting of the litter frame 28 with respect to the base 22 can also be adjusted. That is, the litter frame 28 includes a head end 36 and a foot end 38, each of whose height can be independently adjusted by the nearest lift 26. The patient support apparatus 20 is designed so that when an occupant lies thereon, his or her head will be positioned adjacent to the head end 36 and his or her feet will be positioned adjacent to the foot end 38.

The litter frame 28 provides a structure for supporting the support deck 30, the headboard, the footboard 32, and the siderails 34. The support deck 30 provides a support surface for a mattress (not shown in FIG. 1), or other soft cushion, so that a person may lie and/or sit thereon. The support deck 30 is made of a plurality of sections, some of which are pivotable about generally horizontal pivot axes. In the embodiment shown in FIG. 1, the support deck 30 includes a head section 40, a seat section 42, a thigh section 44, and a foot section 46. The head section 40, which is also sometimes referred to as a Fowler section, is pivotable about a generally horizontal pivot axis between a generally horizontal orientation (not shown in FIG. 1) and a plurality of raised positions (one of which is shown in FIG. 1). The thigh section 44 and the foot section 46 may also be pivotable about generally horizontal pivot axes.

The patient support apparatus 20 includes a plurality of user interfaces or control panels 48 that enable a user of the patient support apparatus 20, such as a patient and/or an associated caregiver, to control one or more aspects of the patient support apparatus 20. In the embodiment shown in FIG. 1, the patient support apparatus 20 includes a footboard control panel 48a, a pair of inner siderail patient control panels 48b (only one of which is visible), and a pair of outer siderail caregiver control panels 48c (only one of which is visible). The footboard control panel 48a and the outer siderail control panels 48c are intended to be used by caregivers, or other authorized personnel, while the inner siderail control panels 48b are intended to be used by the patient associated with the patient support apparatus 20.

Not all of the control panels 48 include the same controls and/or functionality. In the illustrated embodiment, the footboard control panel 48a includes a substantially complete set of controls for controlling the patient support apparatus 20 while the control panels 48b and 48c include a selected subset of those controls. The control panels 48 may include controls for allowing a user to do one or more of the following: change a height of the support deck 30, raise or lower the head section 40, activate and deactivate a brake for the wheels 24, arm an exit detection system, take a weight reading of the patient, activate and deactivate a propulsion system, and communicate with a healthcare facility computer network installed in the healthcare facility in which the patient support apparatus 20 is positioned. The inner siderail control panels 48b may also include a nurse call control that enables a patient to call a nurse. A speaker and microphone are included in order to allow the patient to orally communicate with the remotely positioned nurse.

The controls for carrying out any of the aforementioned functions may be implemented as buttons, dials, switches, or other devices. Any of the control panels 48a-c may also include a display for displaying information regarding the patient support apparatus 20. The display is a touchscreen in some embodiments, and may include one or more control icons for carrying out any of the control functions described herein.

The mechanical construction of those aspects of the patient support apparatus 20 not explicitly described herein may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that those aspects of the patient support apparatus 20 not explicitly described herein can alternatively be designed with other types of mechanical constructions, such as, but not limited to, those described in commonly assigned, U.S. Pat. No. 7,690,059 issued to Lemire et al., and entitled HOSPITAL BED; and/or commonly assigned U.S. Pat. Publication Number 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of those aspects of the patient support apparatus 20 not explicitly described herein may also take on forms different from what is disclosed in the aforementioned references.

Figure 2:
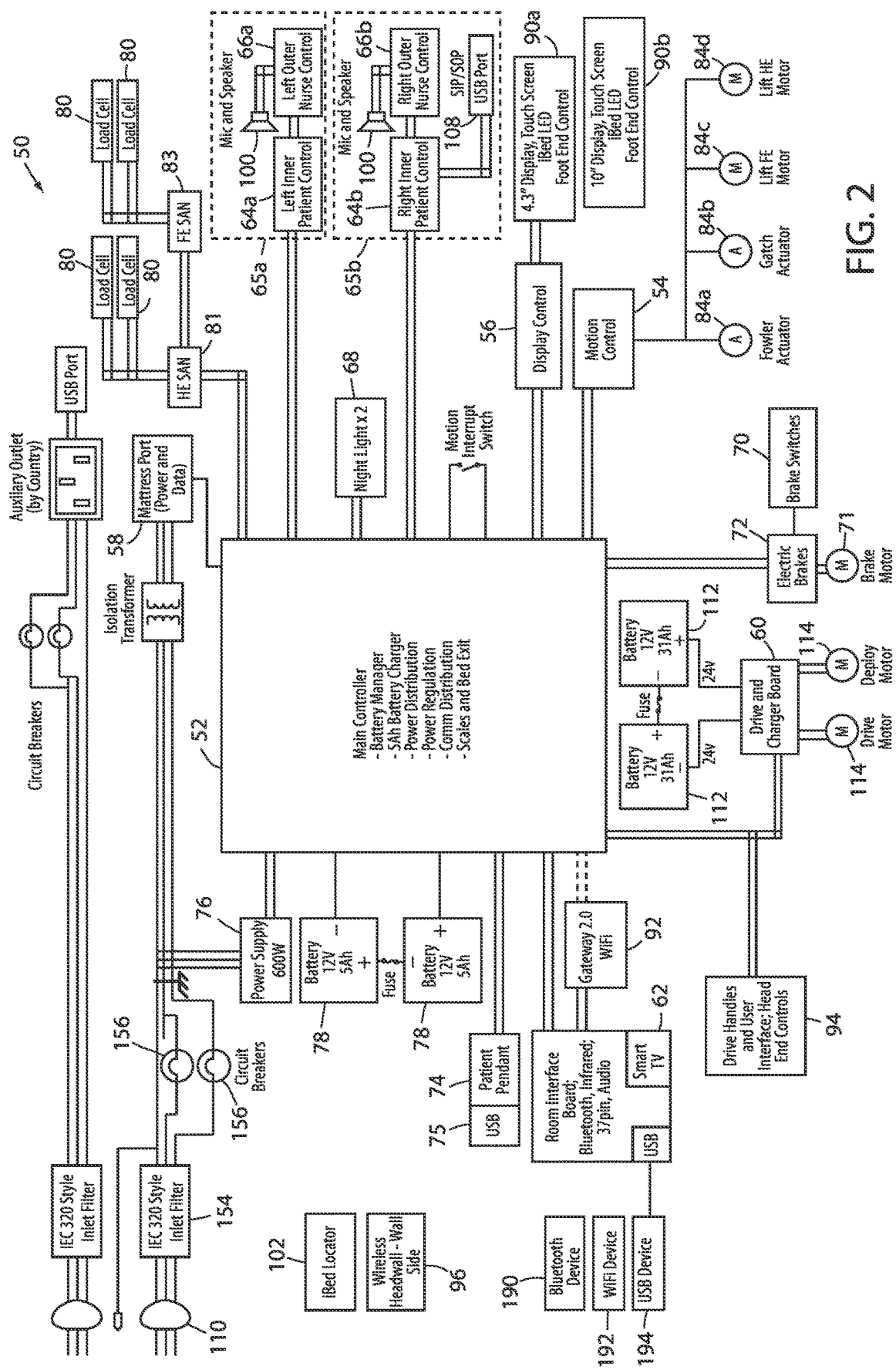
FIG. 2 is a diagram of a control system for use in conjunction with the patient support apparatus in accordance with one embodiment.

Referring now to FIG. 2, the patient support apparatus 20 includes a control system 50 that controls the various electrical and mechanical functions of patient support apparatus 20. The control system 50 includes a main control board 52 electrically coupled to a plurality of other control boards, including a motion control board 54, a display control board 56, a mattress control board 58, a propulsion control board 60, a room interface board 62, a left inner siderail control panel board 64a, a right inner siderail control panel board 64b, a left outer siderail control panel board 66a, and a right outer siderail control panel board 66b. All of these boards may communicate with the main control board 52 over one or more internal network communication buses and/or protocols, such as, but not limited to, one or more Controller Area Network (CAN) buses that operate in accordance with one or more of the ISO standards 11898-1, 11898-2, and/or 11898-3. Alternatively, or additionally, two or more boards of the control system 50 may communicate using the CAN FD 1.0 (Flexible Data-Rate) standard. Still further, some of the boards of the control system 50 may alternatively or additionally communicate using the Local Interconnect Network (LIN) serial network protocol. Indeed, in some embodiments, two or more of the boards of the control system 50 may translate messages from one protocol to another, such as is disclosed in commonly assigned U.S. patent application Ser. No. 15/903,477 filed Feb. 23, 2018, by inventors Krishna Bhimavarapu et al. and entitled PATIENT CARE DEVICES WITH ON-BOARD NETWORK COMMUNICATION, the complete disclosure of which is hereby incorporated herein by reference.

In addition to the aforementioned electrical boards, main control board 52 of control system 50 is also adapted to communicate with the following: a night light 68, a brake switch 70, an electric brake 72, a patient pendant 74, and a power supply 76. The main control board 52 also receives electrical power from a pair of main batteries 78. Still further, the main control board 52 is in communication with one or more load cells 80 (e.g., four load cells 80) that are part of a scale/exit detection system.

Figure 3:
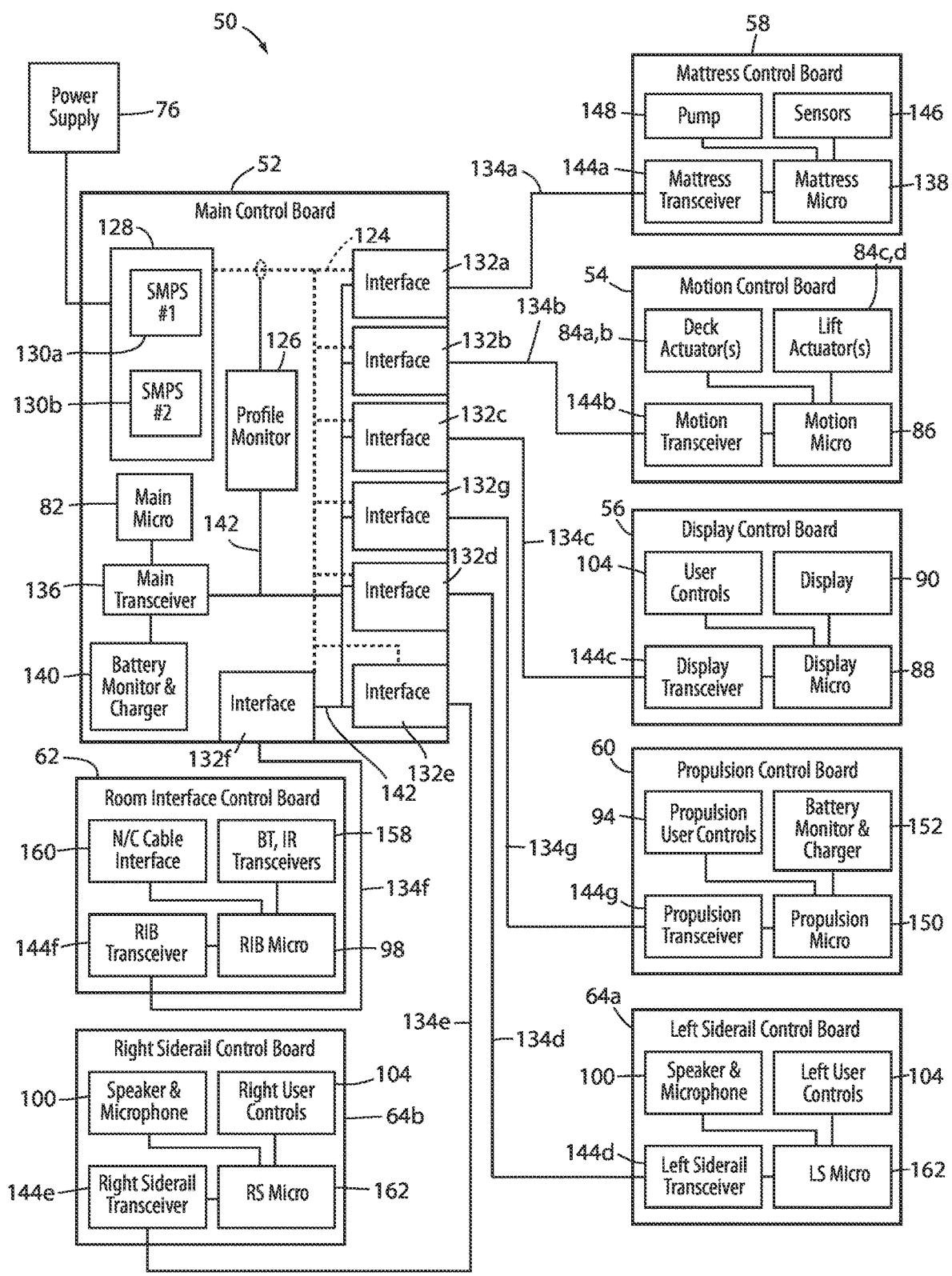
FIG. 3 shows a portion of the control system in accordance with one embodiment.

As discussed herein with respect to FIG. 3, the main control board 52 may include at least one main microcontroller 82 that oversees the operation of the patient support apparatus 20. The main microcontroller 82 also oversees the distribution of electrical power to the various components of the patient support apparatus 20. In general, the main control board 52 receives electrical power from either main batteries 78 or power supply 76, which is adapted to be coupled to a conventional AC wall outlet, and the main control board 52 controls the distribution of that electrical power to the various boards and components with which the main control board 52 is in communication. The manner in which the main microcontroller 82 oversees this power distribution is discussed herein. Before proceeding to that discussion, however, the boards and other components of the control system 50 will now be described.

The motion control board 54 (FIGS. 2-3) includes at least one motion microcontroller 86 that controls the movement of those components of the patient support apparatus 20 that are able to be moved on the patient support apparatus 20. In the embodiment shown in FIG. 2, the motion control board 54 communicates with one or more motorized actuators 84 (e.g., four motorized actuators 84). These include a Fowler actuator 84a, a gatch actuator 84b, a foot end lift actuator 84c, and a head end lift actuator 84d. The Fowler actuator 84a controls the pivoting of the head section 40 (also known as a Fowler section) of the support deck 30 about a generally horizontal pivot axis. The gatch actuator 84b controls the raising and lowering of the joint between the thigh section 44 and the foot section 46 of support deck 30. The gatch actuator 84b therefore raises and lowers the patient's knees when the patient is lying on a mattress positioned on top of support deck 30. The foot end lift actuator 84c controls the upward and downward movement of the lift 26 positioned toward the foot end 38 of the patient support apparatus 20. The head end lift actuator 84d controls the upward and downward movement of the lift 26 positioned toward the head end 36 of the patient support apparatus 20.

The motorized actuators 84 of the control system 50 may be linear actuators, rotary actuators, or other types of actuators capable of raising, lowering, and/or pivoting the components of the patient support apparatus 20 to which they are coupled. The motorized actuators 84 are electrically powered in the illustrated embodiments, but may alternatively be implemented as hydraulic, electro-hydraulic, pneumatic, or the like. The motorized actuators 84 are controlled by one or more controls positioned on one or more of the control panels 48a-48c. In some embodiments, one or more of the motorized actuators 84 are implemented in any of the manners disclosed in commonly assigned U.S. patent application Ser. No. 15/449,277 filed Mar. 3, 2017 by inventors Aaron Furman et al. and entitled PATIENT SUPPORT APPARATUS WITH ACTUATOR FEEDBACK, the complete disclosure of which is incorporated herein by reference. Other types of actuators may be used.

The motion microcontroller 86 or motor microcontroller in the illustrated embodiment of FIG. 3 may control the movement of the motors within the motorized actuators 84 by sending a pulse width modulated (PWM) signal to the motors in response to a user activating one of the actuator controls on one or more of the control panels 48. By changing the duty cycle of the PWM signals sent to the motor, the motion microcontroller 86 is able to control the speed of the motor. In some embodiments, the motion microcontroller 86 controls the operation of each motor of each motorized actuator 84 using an H-bridge of the type disclosed in commonly assigned U.S. patent application Ser. No. 14/838,693 filed Aug. 28, 2015, by inventors Daniel Brosnan et al. and entitled PERSON SUPPORT APPARATUS WITH ACTUATOR BRAKE CONTROL, the complete disclosure of which is incorporated herein by reference. The motion microcontroller 86 may utilize the braking technique disclosed in the aforementioned '693 Application, or it may use another braking technique. Still further, the motion microcontroller 86 may control the motors of the motorized actuators 84 in manners other than using PWM signals and/or in other manners than what is disclosed in the aforementioned '693 Application.

The display control board 56 may include at least one display microcontroller 88 that oversees the content displayed on a display 90 of at least one of the control panels 48. The display 90 may be positioned at any one or more of the three control panels 48a-c. As shown in FIG. 2, the display 90 may take on a variety of different sizes, such as a display 90a having a 4.3 inch diagonal dimension, or a display 90b having an 8 inch diagonal dimension. Other sized displays may be provided. In those embodiments of the patient support apparatus 20 in which the display 90 is implemented as a touchscreen, the display 90 may also be configured to send commands and information back to the main control board 52 indicating which touch screen controls have been activated by a user. In the particular embodiment of the display control board 56 shown in FIG. 2, the display control board 56 is in communication with a network transceiver board 92. The network transceiver board 92 includes a wired or wireless network transceiver (e.g., Ethernet port or WiFi radio) adapted to communicate with the healthcare facility's local area network. Data received from the network transceiver board 92 may be forwarded to the main control board 52 for processing, and the main control board 52 may be adapted to send data to the network transceiver board 92 for forwarding to one or more servers in communication with the healthcare facility's local area network. The network transceiver board 92 may be coupled to the main control board 52 via a direct interface or indirectly via the room interface board 62 and an interface provided by the room interface board 62.

In some embodiments, the patient support apparatus 20 communicates with a patient support apparatus server (not shown) via the wireless access points often positioned throughout a typical healthcare facility. In some embodiments, the patient support apparatus server is a server commercially offered for sale by Stryker Medical of Kalamazoo, Michigan. In other embodiments, the patient support apparatus server is a different type of server. Regardless of its specific type, the patient support apparatus server coordinates communications between the various patient support apparatuses 20 in a healthcare facility and any of the other applications or servers that are present on the local area network. Thus, the patient support apparatus server receives communications from the patient support apparatuses 20 and then forwards—or makes available—information from those communications to selected entities on the local area network, as appropriate.

The mattress control board 58 is adapted to control the operation of a powered mattress positioned on top of the support deck 30. The powered mattress may take on a variety of different forms. In at least one embodiment, the powered mattress is constructed in accordance with any of the powered mattresses disclosed in either of the following commonly assigned U.S. Pat. No. 9,468,307 issued Oct. 18, 2016, to Lafleche et al. and entitled INFLATABLE MATTRESS AND CONTROL METHODS; and U.S. Pat. No. 9,782,312 issued Oct. 10, 2017, to Brubaker et al. and entitled PATIENT SUPPORT, the complete disclosures of both of which are incorporated herein by reference. Still other powered mattresses are able to be used. Further, in some embodiments, the mattress control board 58 is adapted to control a plurality of different types of powered mattresses and includes a sensor for detecting the type of mattress supported on the support deck 30, as well a mattress microcontroller 138 with corresponding programming to carry out the control of the specific type of mattress detected.

When controlling the mattress positioned on top of the support deck 30, the mattress control board 58 communicates with the mattress by way of a serial cable that couples between the mattress control board 58 and the mattress. In some embodiments, the serial cable is a USB cable, while in other embodiments a different type of cable is used. In still other embodiments, the mattress control board 58 may wirelessly communicate with the mattress using any known wireless communication technique, including, but not limited to, inductive communication. One example of a mattress control board on a bed that uses inductive communication with a mattress positioned on top of the bed is disclosed in commonly assigned U.S. Pat. No. 9,289,336 issued Mar. 22, 2016, to inventors Clifford Lambarth et al. and entitled PATIENT SUPPORT WITH ENERGY TRANSPORT, the complete disclosure of which is incorporated herein by reference. The mattress control board 58 may be configured to implement the inductive communication techniques disclosed in this '336 Patent.

Regardless of the physical communication method between the mattress control board 58 and the powered mattress, the mattress control board 58 may be configured to put the mattress into at least two different states: a therapy state and a non-therapy state. In the therapy state, the mattress is carrying out one or more therapies on the patient. Such therapies may include, but are not limited to, rotational therapy, turning therapy, and percussion therapy. In general, any therapy that requires the mattress to run an air pump or blower in order to change the inflation of one or more bladders within the mattress may cause the mattress to be in a state that is considered a "therapy state" for purposes of the description herein. Further, for purposes of the description herein, the "non-therapy state" refers to the mattress when the air pump or blower is not being used. The therapy state generally consumes significantly more electricity than the non-therapy state due to the operation of the air pump or blower. The mattress control board 58 communicates the current state of the mattress (therapy or non-therapy state) to the main control board 52 and, as discussed herein, the main control board 52 uses this state information to manage the distribution of electrical power to the components of the patient support apparatus 20.

In order to carry out the therapy state, the mattress microcontroller 138 (FIG. 3) of the mattress control board 58 selectively inflates and deflates one or more bladders contained within the mattress. In some instances, the inflation and deflation of these bladders is carried out with feedback from one or more sensors 146, such as, but not limited to, one or more air pressure sensors, humidity sensors, and/or other types of sensors. The mattress microcontroller 138 also communicates with a pump or blower 148 that is used to inflate the selected mattress bladders.

The propulsion control board 60 controls an optional propulsion system that may or may not be included with the patient support apparatus 20. When included, the propulsion control board 60 selectively drives at least one wheel 24 of the patient support apparatus 20 to thereby reduce the amount of effort required by a caregiver or other healthcare personnel when moving the patient support apparatus 20 from one location to another. The propulsion control board 60 therefore is adapted to drive at least one propulsion motor 114 (FIGS. 2-3) that drives at least one wheel 24 of the patient support apparatus 20. The propulsion control board 60 includes a propulsion user interface 94 that allows a caregiver to control the propulsion system (e.g., start, stop, accelerate, decelerate, steer, etc.), and a propulsion microcontroller 150 that oversees the operation of the motor in response to the inputs received from the propulsion user interface 94 and/or commands received from the main microcontroller 82. The propulsion microcontroller 150 also oversees a battery monitor and charging circuit 152 that monitors the charge level of the propulsion batteries 112 and that recharges those batteries when the power plug 110 is coupled to a source of external electrical power and when other conditions are met, as discussed herein.

The propulsion user interface 94 may take on a variety of different forms, but in at least one embodiment, it includes one or more handles with one or more sensors that, when pushed, drive the patient support apparatus 20. One example of a propulsion system and its user interface that is suitable for incorporation into the patient support apparatus 20 is disclosed in commonly assigned U.S. patent application Ser. No. 15/471,361 filed Mar. 28, 2017, by inventors Thomas Puvogel et al. and entitled PATIENT SUPPORT APPARATUSES WITH DRIVE SYSTEMS, the complete disclosure of which is incorporated herein by reference. Another example of a propulsion system and its user interface that is suitable for incorporation into the patient support apparatus 20 is disclosed in commonly assigned U.S. patent application Ser. No. 15/189,149 filed Jun. 22, 2016, by inventors Jerald Trepanier et al. and entitled PERSON SUPPORT APPARATUSES WITH DRIVE CONTROLS, the complete disclosure of which is also incorporated herein by reference. Still other types of propulsion systems and/or drive controls may be incorporated into the patient support apparatus 20.

Figure 4:
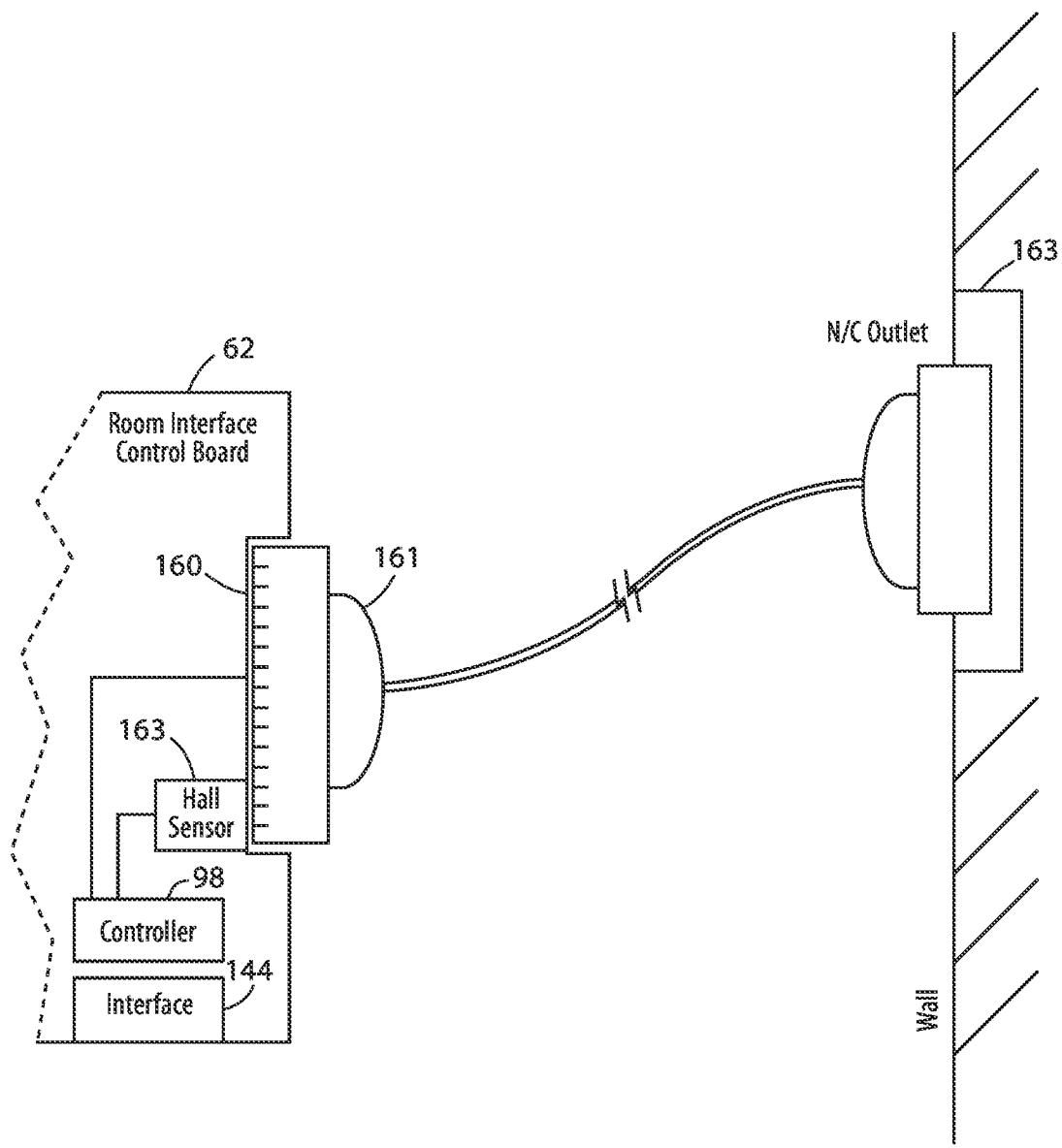
FIG. 4 shows a nurse call cable interface in accordance with one embodiment.

The room interface board 62 (FIG. 2) of the control system 50 oversees communication between the patient support apparatus 20 and one or more external devices positioned within the room of the healthcare facility in which the patient support apparatus 20 is currently located. The room interface board 62 includes a room interface microcontroller 98 (FIG. 3), one or more transceivers 158 for communicating with a fixed locator 102 and/or a wireless wall module 96, a room interface board transceiver 144f, and a nurse call cable interface 160. The room interface board microcontroller 98 oversees operation of the room interface board 62, as well as the communications between the patient support apparatus 20 and the in-room devices. One of the communication functions carried out by the room interface board 62 is the communication between the patient support apparatus 20 and a conventional nurse call system. Conventional nurse call systems include one or more nurse call servers coupled to a healthcare facility's local area network, one or more nurse call outlets physically coupled to the headwall of each patient room, and wiring coupling the nurse call outlets to the nurse call server and/or another call-receiving and processing structure. In the particular embodiment shown in FIGS. 2, 3, and 4, the room interface board 62 is adapted to couple to, and communicate with, a nurse call outlet via either a nurse call cable 161 or wirelessly. When communicating by a nurse call cable 161, a first end of the nurse call cable 161 is coupled to a port on the patient support apparatus 20, such as the nurse call cable interface 160, which is in communication with the room interface board 62, and the other end of the nurse call cable 161 is plugged into the nurse-call outlet 163 mounted in the room's headwall. One example of the functions and structures that may be incorporated into the room interface board 62 is disclosed in more detail in commonly assigned U.S. patent application Ser. No. 15/945,437 filed Apr. 4, 2018, by inventors Krishna Bhimavarapu et al. and entitled PATIENT SUPPORT APPARATUSES WITH RECONFIGURABLE COMMUNICATION, the complete disclosure of which is incorporated herein by reference.

When the room interface board 62 communicates wirelessly with the nurse call system, it is configured to wirelessly communicate with a wall module 96 that is physically coupled to the nurse call outlet via a cable. Such communication takes place, in at least some embodiments, via a Bluetooth transceiver 158 (FIG. 3) incorporated into, or otherwise in communication with, the room interface board 62. Suitable examples of wall modules 96 with which the room interface transceiver(s) 158 can wirelessly communicate are the headwall interfaces disclosed in commonly assigned U.S. Patent Publication Number 2016/0038361 published Feb. 11, 2016, by inventors Krishna Bhimavarapu et al. and entitled PATIENT SUPPORT APPARATUSES WITH WIRELESS HEADWALL COMMUNICATION, the complete disclosure of which is incorporated herein by reference. Additional functions and/or structures that may be performed by, or included with, the room interface board 62 when wirelessly communicating with a wall module 96 are disclosed in the following commonly assigned patent references and may be implemented in the patient support apparatus 20 herein: U.S. Patent Application Ser. No. 62/600,000 filed Dec. 18, 2017, by inventor Alexander J. Bodurka and entitled SMART HOSPITAL HEADWALL SYSTEM; U.S. Patent Application Ser. No. 62/587,867 filed Nov. 17, 2017, by inventors Alexander J. Bodurka et al. and entitled PATIENT SUPPORT APPARATUSES WITH LOCATION/MOVEMENT DETECTION; and U.S. Patent Application Ser. No. 62/598,787 filed Dec. 14, 2017, by inventors Alexander J. Bodurka et al. and entitled HOSPITAL HEADWALL COMMUNICATION SYSTEM, the complete disclosures of all of which are incorporated herein by reference. Still other types of wireless communication with a nurse call system may be used.

The nurse call cable interface 160 of the room interface board 62 includes a plurality of switches that the room interface microcontroller 98 selectively opens and closes in order to communicate via a nurse call cable 161 with the nurse call system. The switches are in electrical communication with corresponding pins of the nurse call cable 161, and the opening and closing of selected ones of the switches are sensed by the nurse call system, thereby enabling the patient support apparatus 20 to communicate with the nurse call system. The room interface board 62 also includes electronic circuitry for transmitting and receiving audio signals. The audio signals include audio signals corresponding to voice communications between the patient and a remotely positioned nurse, as well as audio signals from an in-room entertainment device, such as a television. When communicating with a remotely positioned nurse, the patient communicates via a microphone and speaker combination 100 built into one or both of the siderails 34 (FIGS. 2 and 3). The signals from the microphone are forwarded to the room interface board 62 for forwarding to the nurse call system. Likewise, audio signals from the remotely positioned nurse that are received by the room interface board 62 from the nurse call system are forwarded to the speaker(s) of the patient support apparatus 20.

The room interface board 62 also is adapted, in some embodiments, to communicate with an adjacent fixed locator 102 (FIG. 2) in order to allow either the patient support apparatus 20, or a server in communication with the patient support apparatus 20, to determine its location within the healthcare facility. The fixed locators 102 can be positioned on walls, ceilings, or in other fixed locations whose absolute positions within the healthcare facility are known. Each fixed locator 102 may include a location identifier that uniquely identifies and distinguishes that particular locator 102 from all other such locators 102 within the healthcare facility. The room interface board 62 includes a location transceiver 158 that is specifically adapted to communicate with an adjacent fixed locator 102. In some embodiments, the location transceiver 158 is an infrared transceiver. The fixed locator 102 transmits a unique identifier to the location transceiver 158, which then forwards it to the room interface microcontroller 98. The room interface microcontroller 98 appends the unique ID, or otherwise incorporates it into, the wireless messages it transmits to a local area network, such as to a patient support apparatus server on the healthcare facility's local area network. The room interface microcontroller 98 may also use the unique ID as an address when it sends wireless messages via its wireless transceiver (e.g., Bluetooth) to the adjacent wall module 96. In this manner, any other wall modules 96 that may be within Bluetooth range of the room interface board's transceiver do not respond to these messages because they are not addressed to them.

In one embodiment, the location transceiver 158 coupled to the room interface board 62 is able to communicate with a nearby fixed locator 102 only when the patient support apparatus 20 is positioned within a relatively close proximity thereto. Such proximity may be on the order of five to ten feet, or it may be other distances. In some embodiments, the location transceiver 158 communicates with fixed locators 102 at least partially via infrared signals, although it is to be understood that other types of signals may be used for communication between the locators 102 and the room interface board 62. The fixed locator 102 sends a location identifier that uniquely identifies the fixed locator 102 to the location transceiver 158 when the patient support apparatus 20 is positioned sufficiently adjacent the fixed locator 102.

In one embodiment, because the locations of the locators 102 are known, and because the patient support apparatuses can only communicate with a given locator 102 (via the location transceiver of the room interface board 62) when they are within a close proximity to the given locator 102, the very establishment of such communication indicates that the patient support apparatus 20 is in close proximity to a given locator 102 whose location is known. This allows the location of a patient support apparatus 20 to be determined. Details of the operation of locators 102 and the location transceivers, as well as the manner in which they can be used to determine location, are found in commonly assigned, U.S. patent application Ser. No. 12/573,545 filed Oct. 5, 2009 by applicants David Becker et al. and entitled LOCATION DETECTION SYSTEM FOR A PATIENT HANDLING DEVICE and U.S. patent application Ser. No. 15/909,131 filed Mar. 1, 2018 by applicants Michael Joseph Hayes et al. and entitled PATIENT SUPPORT APPARATUS COMMUNICATION SYSTEMS, the complete disclosures of which are also incorporated by reference herein. The fixed locators 102 may also take on any of the forms, and perform any of the functions, disclosed in commonly assigned U.S. patent application Ser. No. 14/819,844 filed Aug. 6, 2015, by inventors Krishna Bhimavarapu et al. and entitled PATIENT SUPPORT APPARATUSES WITH WIRELESS HEADWALL COMMUNICATION; Ser. No. 16/217,203 filed Dec. 12, 2018, by inventor Alex Bodurka, and entitled SMART HOSPITAL HEADWALL SYSTEM; Ser. No. 16/193,150 filed Nov. 16, 2018, by inventors Alexander Bodurka et al. and entitled PATIENT SUPPORT APPARATUSES WITH LOCATION/MOVEMENT DETECTION; and Ser. No. 16/215,911 filed Dec. 11, 2018, by inventors Alex Bodurka et al. and entitled HOSPITAL HEADWALL COMMUNICATION SYSTEM, the complete disclosures of all of which are incorporated herein by reference.

The room interface board 62 in one embodiment may control operation of the network transceiver board 92, which may include a Ethernet port or WiFi radio but is not so limited. The network transceiver board 92 may include communication capabilities for any type of wired or wireless configuration, or any combination thereof, including, for instance, USB, near field communication (NFC), Bluetooth Low Energy (BTLE), Ethernet and WiFi. In the illustrated embodiment, the network transceiver board 92 is powered by and operable to communicate with the room interface board 62. For instance, in the illustrated embodiment, the network transceiver board 92 is operable to communicate with the network device 192 (e.g., a WiFi capable device capable of communicating with the network transceiver board 92 via WiFi). Communications and/or power information pertaining to operation of the network transceiver board 92 may be transmitted to the main control board 52. The connection between the room interface board 62 and the network transceiver board 92 may be provided via an interface, similar in many respects to an interface provided by the main control board 52 and described herein.

Optionally, the network interface board 92 may be coupled to the main control board 52, such that the network interface board 92 is powered by and operable to communicate with the main control board 52 via an interface provided by the main control board 52.

The room interface board 62 may include one or more integral communication aspects, such as USB, infrared, BTLE and WiFi. One or more communication capabilities of the network transceiver board 92 described herein may be incorporated into the room interface board 62. In one embodiment, the network transceiver board 92 may be absent such that the room interface board 62 provides communication capabilities associated with the network transceiver board 92. In the illustrated embodiment, the room interface board 62 includes USB and BTLE communication interfaces, whereas the network transceiver board 92 provides a WiFi communication interface. The communication capabilities and roles of the room interface board 62 and the network transceiver board 92 may vary from this configuration depending on the application. For instance, the network transceiver board 92 may include a WiFi communication interface and a BTLE interface, and the room interface board 62 may include the USB communication interface. As depicted in the illustrated embodiment, the room interface board 62 and the network interface board 92 may communicate with one or more devices, depending on their communication capabilities, such as the BTLE device 190, the network device 192 (e.g., a WiFi device), and the USB device 194. Communications with these one or more devices, and/or a characteristic of the communications (e.g., signal strength, command responses, authentication information, and authorization information), may be communicated to the main control board 52 as part of a signature analysis of the one or more devices, as described herein.

The inner and outer siderail control boards 64 and 66 (FIGS. 2 and 3), also described as the left siderail boards 65*a* and the right siderail boards 65*b*, are adapted to control the corresponding inner and outer control panels 48*b* and 48*c*. As discussed herein, each of the control panels 48*a-c* may include a plurality of user controls for controlling various functions of the patient support apparatus 20. One or more of the control panels 48*a-c* may also or alternatively include a display. When included, the display may be a touch screen display in at least some embodiments, although it is to be understood that a non-touch screen display may alternatively be used. It is also to be understood that any of the control panels 48*a-c* may be implemented without any display at all. The controls can be touch-sensitive controls that may be physically implemented in a variety of different manners. In some embodiments, the controls may be implemented as capacitive sensors positioned adjacent to the display that capacitively detect when a user presses them. In other embodiments, the controls are implemented as buttons, switches, or other types of force or touch-sensitive devices. In still other embodiments, the one or more of controls 104 may be incorporated into the touchscreen display. Still other variations are possible.

The controls of the control panels 48*a-c* may include controls for raising/lowering the litter frame 28, changing the position of a section 40-46 of the support deck 30, activating/deactivating a brake, controlling a scale/exit detection system (e.g., taking a weight reading, arming an exit detection system, etc.), locking out one or more functions, setting an alert, inputting patient information and/or therapy data (e.g., a prescribed turning frequency, etc.), and/or other controls. At least one of the inner control panels 48b also include a nurse call button, as well as the speaker and microphone 100, which collectively enable the patient to call and talk to a remotely positioned nurse, such as a nurse located at a corresponding nurses' station within the healthcare facility.

The siderail control boards 64 and 66 each include siderail microcontrollers 162 that process the controls 104 activated by a user and send appropriate messages to the main control board 52 in response to the activation of the controls. For example, if a user presses a control dedicated to the raising head section 40, the siderail microcontroller 162 of the siderail control board 64 (if the inner siderail control panel 48b was activated) or the siderail microcontroller 162 of the siderail control board 66 (if the outer control panel 48c was activated) sends a message to the main control board 52 instructing it to raise the head section 40. The main control board 52 forwards the message to the motion control board 54 which, in turn, sends the appropriate control signals to the motorized actuator 84a, thereby causing the motorized actuator 84a to raise the head section 40. Alternatively, the microcontroller 162 of the siderail control boards 64 or 66 may send a motion control message directly to the motion control board 54 in response to a user activating the control 104 for raising the head section 40, thereby avoiding the need for the main control board 52 to act as an intermediary between the boards 64 (or 66) and the motion control board 54. The siderail control boards 64 and 66 may also control the illumination of the controls, any audio and/or visual alerting structures built into the siderails 34, a USB port 108 (FIG. 2), and the microphone and speakers 100. The USB port 108, if included, may allow a patient to charge any USB compatible personal electronic devices he or she may possess while positioned on the support deck 30. One example of the functional and/or structural design of the USB port 108 that may be incorporated into the patient support apparatus 20 is disclosed in commonly assigned U.S. patent application Ser. No. 16/035,156 filed Jul. 13, 2018, by inventors Krishna Bhimavarapu et al. and entitled PATIENT SUPPORT APPARATUSES WITH PERSONAL ELECTRONIC DEVICE CHARGING, the complete disclosure of which is incorporated herein by reference.

As described herein, the main control board 52 is in communication with a night light 68, a brake switch 70, and an electric brake 72. The night light 68, when activated, provides illumination to an adjacent area of the floor, thereby helping a patient to navigate during low light conditions. The brake switch 70 is a sensor that sends a signal to the main control board 52 indicating whether the brake of the patient support apparatus 20 is currently activated or not. The brake resists movement of the patient support apparatus 20 when activated, and may include a brake motor 71. In some embodiments, the activation of the brake applies a braking force to all of the wheels 24, while in other embodiments, the activation of the brake applies a braking force to a subset of the wheels 24 and/or to one or more other wheels on the patient support apparatus 20. The electric brake 72 is an electrical actuator that allows a user to electrically activate the brake through a corresponding control 104 positioned on one or more of the control panels 48a-c. The electric brake 72 may be accompanied by a manual actuator such as, but not limited to, one or more pedals, thereby giving the user the option of manually and mechanically actuating the brake or electrically actuating the brake. In some embodiments, the electric brake 72 is constructed in accordance with the electric brake disclosed in commonly assigned U.S. Pat. No. 8,701,229 issued Apr. 22, 2014, to inventors Guy Lemire et al. and entitled HOSPITAL BED, the complete disclosure of which is incorporated herein by reference. Still other types of electric brakes may be used.

The main control board 52 is adapted to communicate with a patient pendant 74 that may be coupled to the patient support apparatus 20. The patient pendant 74, when included, plugs into a port in communication with the main control board 52 and includes one or more controls 104 for controlling various aspects of the patient support apparatus 20. The patient pendant 74 may also include a speaker and microphone 100, thereby enabling the patient pendant 74 to be used as a communication device for communicating with a remotely positioned nurse (via the nurse call system and the room interface board 62, as described previously). Optionally, the patient pendant 74 may include a USB port 75 operable to allow a patient or user to connect a USB device to the patient pendant 74. The USB port 75 may provide one or more of USB charging functionality and communication capabilities with the patient pendant 74 and/or the main control board 52 via the interface between the patient pendant 74 and the main control board 52.

The load cells 80 feed into the main control board 52. The load cells 80 are configured to support the litter frame 28. More specifically, the load cells 80 are configured such that they provide complete mechanical support for the litter frame 28 and all of the components that are supported on the litter frame 28 (e.g., the support deck 30, the footboard 32, the headboard, the siderails 34, etc.). Because of this construction, the load cells 80 detect the weight of not only those components of the patient support apparatus 20 that are supported by the litter frame 28 (including the litter frame 28 itself), but also any objects or persons who are wholly or partially being supported by the support deck 30. The load cells 80 are adapted to detect downward forces exerted by an occupant of the support deck 30. Thus, when an occupant is positioned on the support deck 30 and substantially still (i.e., not moving in a manner involving accelerations that cause forces to be exerted against the support deck 30), the load cells 80 detect the weight of the occupant (as well as the weight of any components of the patient support apparatus 20 that are supported—directly or indirectly—by the load cells 80).

The outputs of the load cells 80 are processed by the main control board 52. In some embodiments, the main microcontroller 82 processes the outputs, while in other embodiments, a separate microcontroller on the main control board 52 processes the outputs. The outputs of the load cells 80 are processed in order to implement a scale function and/or an exit detection function. When implementing the scale function, the main control board 52 sums the outputs of the load cells 80 to determine a weight of the patient. When implementing the exit detection function, the main control board 52 processes the outputs of the load cells 80 to detect when an occupant has exited the patient support apparatus 20, or when an occupant may be about to exit the patient support apparatus 20. One exemplary manner of processing the outputs of the load cells 80 to implement an exit detection function and/or a scale function is described in U.S. Patent Application Publication Number 2017/0003159, filed on Jun. 17, 2016, entitled PERSON SUPPORT APPARATUS WITH LOAD CELLS, which is hereby incorporated by reference herein in its entirety. Another exemplary exit detection function that may be incorporated into the patient support apparatus 20 is described in U.S. Pat. No. 5,276,432, filed on Jan. 15, 1992, entitled PATIENT EXIT DETECTION MECHANISM FOR HOSPITAL BED, which is hereby incorporated by reference herein in its entirety. Other types of scale and/or exit detection functionality and/or algorithms may be used. In the illustrated embodiment, the output of the load cells 80 are respectively conditioned by the head end conditioner 81 and the foot end conditioner 83 for processing by the main control board 52.

In some embodiments, the load cells 80 may be replaced with linear variable displacement transducers and/or any one or more capacitive, inductive, and/or resistive transducers that are configured to produce a changing output in response to changes in the force exerted against them. Still other types of force sensors may be used with the patient support apparatus 20 in lieu of, or in addition to, the load cells 80.

The power supply 76 may be electrically coupled to a power plug 110 (FIG. 2) that is adapted to be inserted into a conventional wall power outlet. That is, the power supply 76 is adapted to receive electrical power from a mains source of electricity and to deliver that power to the main control board 52. As shown in FIG. 2, the power received by the power plug 110 passes through an inlet filter 154 (such as an IEC 320 style inlet filter) and a circuit breaker 156 before being delivered to the power supply 76. The inlet filter 154 may include a fuse and/or other circuitry for limiting the amount of electrical power delivered to the control system 50. The circuit breakers 156 protect the power supply 76 and the rest of the control system 50 from excessive voltage and/or current by interrupting the current flow to the power supply 76 when such a condition is detected.

The power supply 76 performs a number of functions including, but not limited to, rectifying the incoming main power from AC to DC, down converting the incoming voltage to a suitable voltage (e.g., 36 volts), providing overcurrent and/or overvoltage protection, reducing and/or eliminating power noise, and the like. The power supply 76 may be a commercially available off-the-shelf component, and may include a maximum power rating such as, but not limited to, 600 Watts. The output of power supply 76 is fed to the main control board 52 which, as discussed herein, supplies electrical power at different voltages to the various components of the control system 50.

II. Main Board

Before turning to the power circuitry of the main control board 52, it can be seen from FIG. 2 that the control system 50 is optionally capable of operating on battery power. More specifically, the control system 50 in one embodiment may include a pair of main batteries 78 and a pair of propulsion batteries 112. Although different voltages and/or capacities may be used, the main batteries 78 in the illustrated embodiment of FIG. 2 are 12 volt batteries (coupled together in series to generate 24 volts) that each have a capacity of 1.2 ampere-hours. One or more propulsion batteries 112 may also be provided, as shown in the illustrated embodiment as 12 volt batteries (coupled together in series to generate 24 volts) and having individual capacities of 17.2 ampere-hours. The main batteries 78 may be provided for use in applications where the patient support apparatus 20 may be disconnected from an external power source, such as when the outlet plug 110 is not coupled to an external source of electrical power (or when that external source of electrical power fails).

As explained herein, in embodiments that include the main batteries 78, the main control board 52 may utilize the main batteries 78 to supply power to all of the electrical components of control system 50 with the exception of one or more propulsion motors 114 and the propulsion user interface 94. The propulsion motors 114 drive one or more of the wheels 24 of the patient support apparatus 20 in order to reduce the effort required by a caregiver to move the patient support apparatus 20 to different locations. The propulsion motors 114 operate in response to commands received from the propulsion control board 60 which, in turn, sends those commands in response to corresponding user inputs from the propulsion user interface 94.

In one embodiment, the main control board 52 may include a plurality of electrically programmable fuses (or "electronic fuses" or "e-fuses," for short). The e-fuses may enable precise current and voltage monitoring to thereby provide feedback to the main microcontroller 82 of the power being delivered to each of the control boards and other components of the patient support apparatus 20 that receive electrical power from main control board 52. Examples of an e-fuse configuration are described in further detail in U.S. application Ser. No. 16/828,323, entitled PATIENT CARE SYSTEM WITH POWER MANAGEMENT, filed Mar. 24, 2020, to Shami et al.—the disclosure of which is hereby incorporated by reference in its entirety.

The main control board 52 in the illustrated embodiment includes a profile monitor 126 operable to obtain an operating signature of one or more devices, and to compare the operating signature to one or more stored signatures to determine if the operating signature corresponds to at least one of the one or more stored signatures. If correspondence (e.g., a match or substantial similarity between one or more characteristics and one or more criterion) is identified for the operating signature by the profile monitor 126, the profile monitor 126 may facilitate continued operation of the one or more devices associated with the operating signature. If correspondence is not identified for the operating signature, the profile monitor 126 may identify the device as unauthorized and initiate steps to facilitate discontinuing operation of the one or more devices and/or aspects of the control system 50 to prevent the one or more devices from influencing operation of or communicating with the control system 50.

The profile monitor 126 in the illustrated embodiment may be operably coupled to the plurality of interfaces 132a-g, enabling the profile monitor 126 to obtain an operating signature with respect to each of the plurality of interfaces 132a-g. It is to be understood that the profile monitor 126 is not limited to obtaining an operating signature in this manner. For instance, an operating signature may be communicated from a device external to the main control board 52 to the profile monitor 126, such as from the room interface board 62 to the profile monitor 126 and in connection with a device communicatively coupled, wired and/or wirelessly, to the room interface board 62.

In the illustrated embodiment, the profile monitor 126 is operably coupled to the power output line 124 for each of the plurality of interfaces 132a-g. The profile monitor 126 is also operably coupled to the communication bus 142 in order to monitor communications pertaining to the plurality of interfaces 132a-g. The profile monitor 126 may be communicatively coupled to the main microcontroller 82 of the main control board 52, enabling the profile monitor 126 to communicate information with respect to an authorized device and/or an unauthorized device being detected as connected to the control system 50. The main microcontroller 82 may determine countermeasures in response to information indicating detection of an unauthorized device, such a discontinuing operation of one or more aspects of the control system 50 and optionally communicating a system error to a user interface and communicating a request for maintenance to an external system.

The profile monitor 126, in one embodiment, may include a sensor configured to detect a characteristic of power provided via the power output line 124 to one or more of the interfaces 132*a-g*. Multiple sensors may be provided to respectively detect multiple characteristics of power. Additionally, or alternatively, multiple sensors may be provided for sensing the characteristic of power provided respectively via the power output line 124 to a plurality of the interfaces 132*a-g*. The characteristic of power detected by the sensor or sensors may include current and/or voltage of the power. Sensor information output from a sensor may form at least a part of an operating signature associated with a device coupled to an interface. Data information may be merged or joined with the sensor information to define at least part of the operating signature.

As discussed herein, the profile monitor 126 may obtain an operating signature or information that forms at least a part of an operating signature from a device external to the main control board 52. For instance, the external device may include a sensor operable to detect information (e.g., sensor information) with respect to an interface, similar to the interfaces 132*a-g*, pertaining to a device connected to or coupled to the interface. An example of such configuration is shown in the illustrated embodiment of FIG. 4 in which a partial view of the room interface board 62 is shown in conjunction with a nurse call cable interface 160 provided for connection to the nurse call cable 161. The nurse call cable interface 160 may include a connection sensor (e.g., a hall effect sensor) operable to detect a connection to the nurse call cable 161. Additionally, or alternatively, the nurse call cable interface 160 may include a current and/or voltage sensor operable to detect a supply of power provided to the nurse call cable 161. The sensor information and/or the connection information may be communicated to the profile monitor circuit 124 via the interface 132*f*.

Although the profile monitor 126 is shown separate from the main microcontroller 82 and part of the main control board 52, it is to be understood that the profile monitor 126 may be configured differently. For instance, the profile monitor 126, or functionality thereof, may be integrate into the main microcontroller 82. As another example, the profile monitor 126 may be provided as part of another component of the control system 50. The profile monitor 126 may include a controller similar to the main microcontroller 82, such as a Kinetis MK66F type controller.

As shown in FIG. 3, the main control board 52 includes a power circuit 128 comprising a pair of switched mode power supplies (SMPS) 130*a* and 130*b*. In one embodiment, the SMPSs 130*a* and 130*b* are DC-to-DC power converters, and the first SMPS 130*a* converts a 36 volt input (from power supply 76) or a 24 volt input (from main batteries 78) into a twelve volt output. The twelve volt output may be fed to a power output line 124. The twelve volt output may also be fed to the second SMPS 130*b*, which takes the twelve volt input and outputs both a 5 volt output and a 3.3 volt output. The 5 volt and 3.3 volt outputs are fed to various components on the main control board 52, as well as to some of the other electrical components of the control system 50. In at least one embodiment, the power circuit 128 feeds power (e.g., twelve volts) to a plurality of interfaces 132*a-f* via the power output line 124, which may be provided as a power bus with positive and negative rails. Alternatively, dedicated power output lines may be provided respectively to each of the plurality of interfaces 132*a-f*, or to a first subset thereof in conjunction with a bus for another subset thereof. Optionally, as discussed herein, e-fuses may be provided between the power output lines and the plurality of interfaces 132*a-f*. The power output line 124 in FIG. 3 is shown in phantom for purposes of disclosure to ease differentiation from the communication bus line 142, which is described herein.

The power circuit 128, in the illustrated embodiment of FIGS. 2 and 3, does not feed power (e.g., twelve volts) to the electric brake 72 or to the propulsion control board 60. The propulsion control board 60 may receive its power from the propulsion batteries 112. The electric brake 72, in at least one embodiment, may receive a 24 volt power supply from the power circuit 128. The power circuit 128 may also feed 5 volts and/or 3 volts to selected ones of the control boards and/or other components of control system 50.

The interfaces 132*a-f* in one embodiment may include a connector. Each connector of the interfaces 132*a-f* may be adapted to receive a corresponding cable 134*a-f* that electrically couples the connector to another component of the control system 50. For example, the connector of the interface 132*a* is physically and electrically configured to receive a first end of a cable 134*a* that has its second end electrically and physically coupled to a mattress control board 58, thereby enabling the main control board 52 to communicate with the mattress control board 58, and vice versa. The connector of the interface 132*b* may do the same for a cable 134*b* that extends between the main control board 52 and the motion control board 54. Similarly, connectors of the interfaces 132*c, d, e,* and *f* couple respectively to cables 134*c, d, e,* and *f*, and enable the main control board 52 to communicate with each of the display control board 56, the left siderail control board 64*a*, the right siderail control board 64*b*, and the room interface board 62, respectively. Similarly, a connector of the interface 132*g* is adapted to physically and electrically receive a first end of a cable 134*g* that has its second end physically and electrically coupled to the propulsion control board 60, thereby enabling the main control board 52 to communicate with the propulsion control board 60, and vice versa.

In addition to delivering electrical power from main control board 52 to the other boards, each cable 134 may also facilitate transfer of data between the respective control boards. In the illustrated embodiment, each connector is a multi-pin connector, where at least two of the pins are used for data communication via the communication bus 142 (e.g., CAN High and CAN Low), at least one pin is used for power high, and at least one pin is used for power low (e.g., ground). Additional pins may be present for sending additional data and/or other signals that are not communicated over the embedded network connection (e.g., the CAN network). As noted, for many components, the data connections comprise a CAN bus, although it will be understood that other communication protocols can be used. For the motion control board 54, the data connection is, in at least some embodiments, a LIN bus. For those components that do not utilize a microcontroller (e.g., night light 68, brake switch 70, electric brake 72, load cells 80), the data connection may be a Serial Peripheral Interface (SPI), I2C, or other type of connection. Still other types of communication protocols may be used.

In at least one embodiment, each connector of the interfaces 132*a-g* is uniquely shaped from the other connectors of the interfaces 132*a-g* such that during manufacturing of the patient support apparatus 20, it is not possible to improperly couple a cable from a specific connector on main control board 52 to an incorrect board. This is because connectors of the cables 134*a*-*g* are respectively matched to the connectors on boards 54-64 and the main connectors on the main control board 52. In one embodiment, the connectors of the cables 134*a*-*g* for the boards 54-64 are unique from each other, but match corresponding connectors on the main control board 52. Thus, in at least one embodiment, the mattress control board 58 includes a connector (not shown) that is the same as connector of the interface 132*a* of main control board 52, and those two connectors are different from any of the other connectors used to couple the main control board 52 to any of the other components of the control system 50. During the manufacturing process of the patient support apparatus 20, connecting a cable from connector of the interface 132*a* of main control board 52 to any other component other than mattress control board 58 may be avoided. This is because cable 134*a* will not match any of the other connectors other than the connector of the interface 132*a* of main control board 52 and the connector on mattress control board 58, which may be similarly shaped and sized to the connector of the interface 132*a*. As a result, if the individual manufacturing patient support apparatus 20 plugs a first end of cable 134*a* into the connector of the interface 132*a*, the other end of the cable will not match any connectors on any of the boards except for mattress control board 58. Similarly, the only cable 134 that will match the connector of the interface 132*b* will be cable 134*b*, and that cable will have a connector on its other end that will only match the connector of the motion control board 54, not the connectors of any of the other control boards. In this manner, the installation of the cabling during the manufacturing of the patient support apparatus 20 is accomplished in a poka-yoke manner; that is, the cabling is designed to be mistake-proof such that it is considered impossible, for example, to couple the display control board 56 to a connector of the main control board 52 other than the proper connector; namely, the connector of the interface 132*c*.

Although the foregoing description of the connectors of the patient support apparatus 20 has been provided with respect to cables 134 that have the same style of connector at each end, it will be understood that this is not required to manufacture the patient support apparatus 20 in a mistake-proof manner. As an alternative, one or more of cables 134 may include a first end connector that is different from the second end connector. In such an embodiment, the patient support apparatus 20 can still be cabled during the manufacturing process in a mistake proof manner so long as each end of the cable is only a match for a single other connector on all of the boards 52-62 (and other components) of patient support apparatus 20. By designing the control system 50 such that each connector of each of the cables is only able to correctly mate with a single other connector on one of the boards, the cables can only be connected to the correct boards.

It is to be understood that the patient support apparatus 20 can be designed with a mixture of cables 134, some of which have the same connectors on each of their ends, and others of which have different types of connectors on each of their ends. In such a design, the cabling can be configured in a mistake-proof manner by ensuring that those cables with identical connectors only match the correct two connectors specific for that cable, and those cables with different connectors have connectors that only match a single connector in the control system 50. Regardless of the specific implementation, the use of mistake-proof cabling ensures that the manufacturing of the patient support apparatus 20 is accomplished in a manner that reduces the costs and wasted time associated with improperly installed cabling.

It is to be understood by those skilled in the art that FIG. 3 shows a simplified connection between power circuit 128 and each of the interfaces 132*a*-*g* and their associated connectors. That is, FIG. 3 shows a single power line 124 connecting power circuit 128 to each of the interfaces 132*a*-*g*. In actuality, two or more separate power lines 124 may extend from the power circuit 128 to two or more lines of the interface 132*a*-*g*, rather than a single line 124 coupled between the power circuit 128 and all of the interfaces 132*a*-*g*.

It is to be understood that FIG. 3 is simplified in the sense that it only shows a portion of the components of the control system 50 that are illustrated in FIG. 2. This is merely done for clarity reasons. The control system 50 of FIG. 3 may include all of the components of the control system 50 of FIG. 2, but only a subset of those are illustrated in FIG. 3 to provide more details regarding several components, functions, and principles of operation of the control system 50.

The main microcontroller 82, in at least one embodiment, is a microcontroller from the Kinetis MK66F family of microcontrollers manufactured by NXP semiconductors of Eindhoven, the Netherlands, such as, but not limited to, the Kinetis MK66FN2MOVLQ18 microcontroller. Other microcontrollers can, of course be used. The microcontrollers of the control boards 52-66 may also be microcontrollers from the Kinetis MK66F family, or they may be from other families of Kinetis microcontrollers, or they may be from still other families, brands, and/or manufacturers. In general, each of the control boards 52-66 include, in addition to the microcontrollers discussed herein, additional circuitry and programming for carrying out the functions described herein. Such additional circuitry may include, but is not limited to, field programmable gate arrays, volatile or non-volatile memory, discrete circuitry, and/or other hardware, software, or firmware that is capable of carrying out the functions described herein. The components of each board can be physically configured in any suitable manner, such as by mounting them all to a single circuit board, or they can be distributed across multiple circuit boards. The instructions followed by each of the microcontrollers in carrying out the functions described herein, as well as the data for carrying out these functions, may be stored in memories (not labeled) mounted to each of the control boards, or otherwise accessible to each microcontroller.

In addition to the aforementioned components, the main control board 52 may include a main transceiver 136 and a battery monitor and charging circuit 140. The battery monitor and charging circuit 140, which will be described in more detail herein, may monitor the charge state of the main batteries 78 and report charge state information to the main microcontroller 82. The battery monitoring and charging circuit 140 also oversees the recharging of the main batteries 78 when the power plug 110 of the patient support apparatus 20 is coupled to an external source of AC power and other conditions are met, as will also be discussed in more detail herein.

The main transceiver 136, in at least one embodiment, is a CAN transceiver adapted to allow the main microcontroller 82 to communicate over a CAN bus. In some embodiments, the main transceiver 136 in the form of a CAN transceiver may be built into the main microcontroller 82. In other embodiments, a CAN transceiver may be a component physically separate from the main microcontroller 82. Still further, in other embodiments, the main transceiver 136 may be a different type of transceiver, such as, but not limited to, a LONWorks transceiver, an Ethernet transceiver, a LIN transceiver, or still a different type of transceiver. Whatever type of transceiver it is, the main transceiver 136 may format the messages and/or commands sent from the main microcontroller 82 into the packet format, frame format, or other format of the communication protocol that is used to communicate with the other control boards of the control system 50. Similarly, the main transceiver 136 also receives packets, frames, or other data structures back from the other control boards and extracts the contents of those packets, frames, or other data for forwarding to the main microcontroller 82. The main transceiver 136 may handle the arbitration and other tasks associated with the first and second layers of the OSI communication model.

Although FIG. 3 illustrates the main transceiver 136 as being coupled to all of the interfaces 132 via the communication line 142 in the form of a single bus line, it is to be understood that this may be varied. That is, in some embodiments, the main microcontroller 82 may divide its internal communications with the other boards of the control system 50 into separate embedded networks that are isolated from each other. For example, the boards 54 and 56 may communicate with the main microcontroller 82 via a first CAN bus, and the remaining boards may communicate with the main microcontroller 82 via a second CAN bus. In such a case, the main microcontroller 82 may include two main transceivers 136, one of which is coupled by a first bus line to interfaces 132*b* and 132*c*, and the other of which is coupled by a second bus line to the other interfaces 132. Still other manners of segmenting the internal network communications may also be implemented.

Each of the control boards may include a transceiver 144*a-g* that is physically coupled to corresponding pins of the respective cable 134*a-g* extending to it from the main control board 52. Thus, for instance, the mattress control board 58 may include a mattress transceiver 144*a* in communication with the cable 134*a*; the motion control board 54 may include a motion transceiver 144*b* in communication with the cable 134*b*; the display control board 56 may include a display transceiver 144*c* in communication with the cable 134*c*; the left siderail control board 64*a* may include a left siderail transceiver 144*d* in communication with the cable 134*d*; the right siderail control board 64*b* may include a right siderail transceiver 144*e* in communication with the cable 134*e*; the room interface board 62 includes a room interface transceiver 144*f* in communication with the cable 134*f*; and the propulsion control board 60 includes a propulsion transceiver 144*g* in communication with the cable 134*g*. The transceivers 144 may perform the same functions described above with respect to the main transceiver 136. That is, they may packetize and depacketize (or otherwise process) messages for transportation over the one or more buses that communicatively couple the main transceiver 136 and the main microcontroller 82 to each of the other boards.

In some embodiments, one or more of the transceivers 144 are commercially available off-the-shelf transceivers that are configured to be able to power down the entire node (e.g., the associated microcontroller and other components of the associated board) while supporting local, remote, and host wake-up. Thus, for example, the mattress transceiver 144*a* may be a transceiver that, upon receipt of a specific message, wakes up the mattress microcontroller 138 after it has gone to sleep. When in the sleep mode, the microcontroller may consume substantially no power (or zero power). The main microcontroller 82 may be adapted to send a sleep command to the mattress transceiver 144*a* (or any of the other transceivers 144) that instructs the corresponding microcontroller to go to sleep. This may reduce the power consumption associated with that particular board. When a microcontroller goes to sleep, the microcontroller may also put to sleep all (or a subset) of the other electrical components of the board (with the exception of the transceiver 144 itself, which may use exceptionally little power). The main microcontroller 82 can therefore put a board to sleep by sending a sleep command to the board's corresponding microcontroller, as well as wake up that microcontroller by sending a wake command to that microcontroller's corresponding transceiver 144. The waking up of the microcontroller in response to a transceiver-received wake command occurs, in at least some embodiments, in less than one second, thereby allowing the control board to be put to sleep and awakened with little delay to the user, and in some cases, without the user being able to notice that a particular board has been put to sleep. The times at which the main microcontroller 82 may put to sleep one or more of the boards on the patient support apparatus 20 are discussed in more detail herein.

The main microcontroller 82 may be configured to control the supply of electrical power to each of the boards 54-66, as well as to the other components of the control system 50. The main microcontroller 82 may facilitate this power distribution control in several different manners, depending on the application. One manner is through commands sent to e-fuses or switches disposed inline between the power circuit 128 and each of one or more of the interfaces 132*a-g*. Another manner is through commands sent to one or more of the microcontrollers of boards 54-66, such as, but not limited to, commands to limit the power consumption of the respective board. The power-limiting commands from the main microcontroller 82 may explicitly tell the recipient microcontroller how to limit the power consumption, or they may tell the recipient microcontroller a power value that is not to be exceeded and leave it up to the recipient microcontroller to follow its own programming to ensure the power value is not exceeded (e.g., using slower speed commands when less power consumption is desired and using faster speed commands when more power consumption is acceptable). Still another manner by which the main microcontroller 82 may control the supply of electrical power to each of the boards 54-56 is through the transmission of wake and sleep commands to the transceivers 144, causing their corresponding microcontrollers to shut down and wake up, and thereby affecting the total amount of electrical power consumed by the patient support apparatus 20 at any given time. Still another manner is through the controlling of when certain actions take place, such as, but not limited to, the charging of the main batteries 78 and/or propulsion batteries 112, the provisioning of mattress therapies, the movement of one or more actuators 84, and still other actions. These various power control techniques are discussed in greater detail herein.

III. Profile Monitor Circuit

Figure 5:
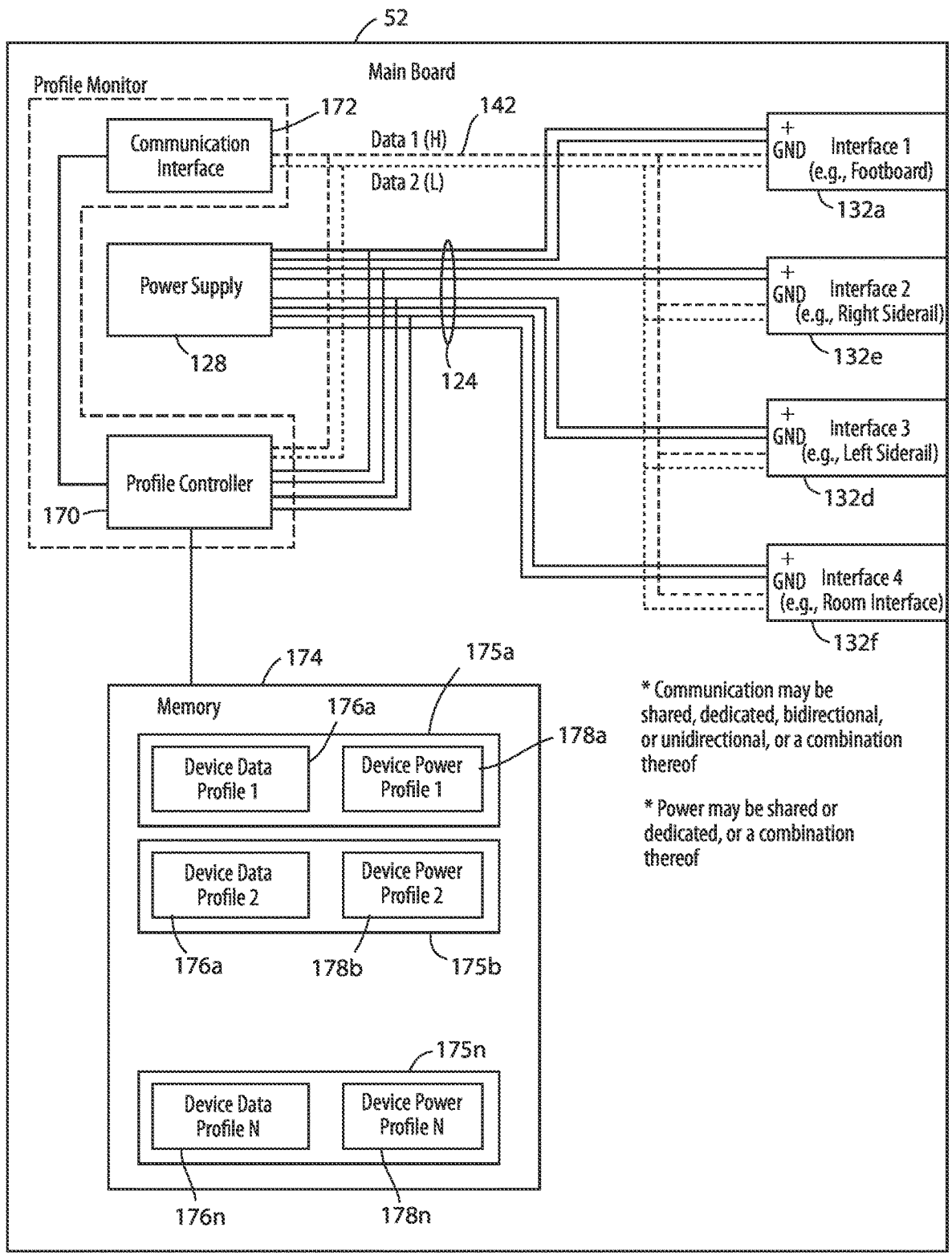
FIG. 5 depicts a profile monitor of the control system in accordance with one embodiment of the present disclosure.

The profile monitor 126 in accordance with one embodiment is shown in FIG. 5 in conjunction with several aspects of the main control board 52. The profile monitor 126 in the illustrated embodiment is shown on the main control board 52 without the main microcontroller 82 for purposes of disclosure. The profile monitor 126 may be separate from or integral to the main microcontroller 82 as depicted in the illustrated embodiment of FIG. 3. The profile monitor 126 in the illustrated embodiment of FIG. 5 includes a profile controller 170 and a communication interface 172. The profile controller 170 may be similar to the main microcontroller 82 as described herein with the exception of executing instructions pertaining to obtaining and analyzing one or more operating signatures with respect to one or more interfaces 132a-g.

The profile monitor 126 may include a communication interface 172 operably coupled to the profile controller 170, as depicted in the illustrated embodiment of FIG. 5. The communication interface 172 may be similar to the main transceiver 136 of the main control board 52. For instance, the communication interface 172 may be configured to communicate in accordance with a communication protocol used by the main transceiver 136, such as the CAN bus protocol. Additional or alternative communication protocols and associated lower level hardware connections may be provided, including LIN bus, RS-485, SPI, I2C, BTLE, WiFi, and Ethernet. The communication interface 172 in the illustrated embodiment is connected to the communication bus 142, including Data 1 and Data 2 bus wires associated respectively with CAN High and CAN Low wires in the illustrated embodiment. Alternative or additional connections may be provided depending on the communication protocol. The communication interface 172 may monitor communications on the communication bus 142, with such communications forming at least part of one or more operating signatures stored in memory by the profile controller 170, as described herein. Communications may be shared as shown in the illustrated embodiment, and unidirectional or bidirectional. In one embodiment, communications may be established via dedicated communication interfaces for one or more of the interfaces 132a-g.

In the illustrated embodiment, the profile controller 170 includes a plurality of integral sensors coupled respectively to the power output line 124 for the plurality of interfaces 132a-f. It is noted that four interfaces 132a, 132d, 132d, 132f are shown in the illustrated embodiment; however, more or fewer interfaces may be provided by the main control board 52 and interfaces 132a-g may be provided on devices external to the main control board 52 (e.g., the room interface board 62). The power output line 124 in the illustrated embodiment includes dedicated power supply lines for each of the interfaces 132a-g in accordance with one embodiment of the present disclosure. The profile controller 170 may be operable to detect a characteristic of power with respect to each of the dedicated power supply lines, and to associate the detected characteristic of power with an interface 132a-g to define at least in part an operating signature associated with the interface 132a-g.

In the illustrated embodiment, the profile controller 170 may be communicatively coupled to signature memory 174 operable to store one or more device signatures 175 representative of authorized devices for use in conjunction with the control system 50. If an operating signature obtained by the profile controller 170 does not correspond to at least one of the device signatures 175, the profile controller 170 may determine that the device for which the operating signature was obtained is an unauthorized device and communicate presence of such an unauthorized device to the main microcontroller 82.

The device signatures 175a, b, n shown in the illustrated embodiment include a device data profile 176 and a device power profile 178; however, the present disclosure is not so limited. A device signature 175 may include one or the other of the device data profile 176 and the device power profile 178. Additionally, or alternatively, the device signature 175 may include a profile for one or more characteristics other than data and power.

Figure 6:
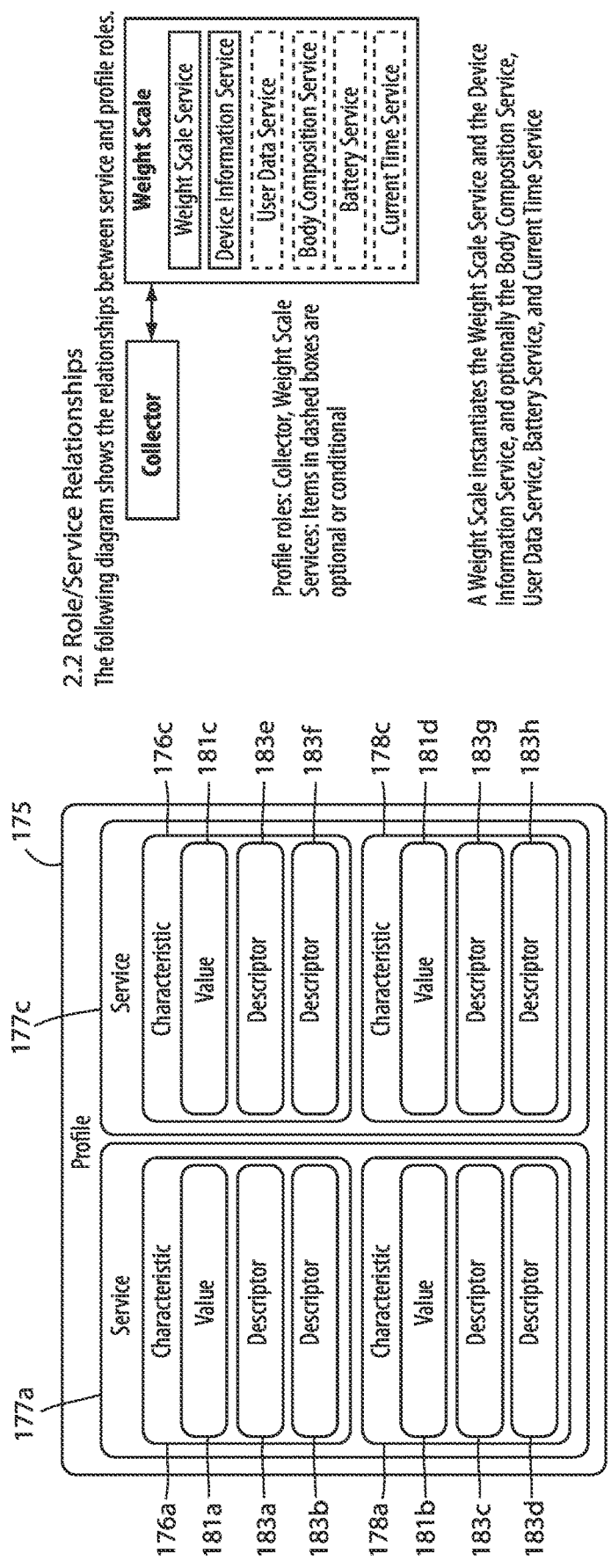
FIG. 6 shows a stored device signature for use in conjunction with the profile monitor and in accordance with one embodiment.

An example of a device signature 175 in accordance with one embodiment is depicted in further detail in FIG. 6. The device signature 175 may include a device data profile 176 and a device power profile 178 as discussed herein. In one embodiment, the device signature 175 may include multiple device data profiles 176a, 176c and multiple device power profiles 178a, 176c, which may respectively define a device service signature 177a, 177c.

The device service signature 177a, 177c may correspond to a function or status for the device associated with the device signature 175. For example, the device may be a weight scale operable to sense a weight of a patient, and to report the sensed weight to the main microcontroller 82 wirelessly via an interface provided by the network transceiver board 92. This functionality may be considered a weight scale service, and may involve communicating information according to a defined format that can be processed by the main microcontroller 82. This defined format or a description thereof may be stored as part of a device service signature 177a associated with a device signature 175 for the weight scale. More specifically, the defined format or a description thereof may be associated with a device data profile 176a of the device service signature 177a. Additional device data profiles 176 and/or one or more device power profiles 178 may form part of the device service signature 177.

The device data profile 176a of the device service signature 177a may include characteristic information (e.g., a device data characteristic) that is known to be associated with data for the service. The characteristic information may include a value 181a-d and one or more descriptors 183a-h associated with the value and characteristic. The value 181a-d, for instance, may be a power demand amount, timing information, or a data format. The descriptor 183a-h may be indicative of the type of characteristic to facilitate management and reporting of authorized and unauthorized devices.

A data format for communications in accordance with one embodiment is shown in the illustrated embodiments of FIGS. 8 and 9. Communications detected on the network bus 142 may be obtained by the profile controller 170, and compared against the data format provided in FIGS. 8-9 as part of a device data profile 176. In one embodiment, the device data profile 176 for a device signature 175 may define an expected exchange of communications in accordance with the data format.

The device power profile 178a of the device service signature 177a may be similar to the device data profile 176a in that the device power profile 178a may include characteristic information (e.g., a device power characteristic, such as power demand) that is known to be associated with providing power for the service. As an example, in the case of the device being a weight scale, a weighing service provided by the weight scale may involve report of a sensed weight according to a particular format or within a range. The data format of this report may correspond to characteristic information of a device data profile 176 of the device service signature 177 for the weight sensing function of the weight scale.

In one embodiment, a device connected to an interface 132 of the control system 50 as described herein may be a communication interface, wired or wireless, including for instance BTLE and WiFi. If a device connects to this communication interface that is not authorized for communication with the interface, the profile monitor 126 may identify such a device as being unauthorized based on an operating signature of the device failing to correspond to a device signature stored in memory. The operating signature, for instance, may pertain to data being generated by the device, such as the format of the data, the timing of data, and the content of the data. These aspects may correspond to a device data profile 176 of a device signature 175. Additional examples of aspects included in the operating signature may include a signal characteristic of communications in a wireless setting, such as an RSSI value for BTLE communications indicating a distance between the device and the patient support apparatus 20. For instance, if the device is associated with an RSSI value indicating the device is outside a threshold range, the profile monitor 126 may direct the control system 50 to treat the device as being unauthorized because the threshold distance is included in the device signature stored in memory and the operating signature of the device does not satisfy this condition.

If a device connected to the communication interface of the control system 50 (e.g., a WiFi or BTLE interface) does not communicate in a manner that corresponds to a device data profile 176 stored in memory, the profile monitor 126 may identify the device as being unauthorized and facilitate disconnection of the device from the communication interface, or affecting communications pertaining to the device, including directing communications to a honeypot, controlling routing of the communications, disconnecting access to a local network (such as a subnet) from a wider network, shutting down a device or devices of the patient support apparatus 20, or any other mitigation steps to prevent communications with the device from affecting operating the control system 50. The control system 50 may generate a notification (e.g., a visible notification or a communicated notification) based on detection of connection of the unauthorized device to an interface of the control system 50. This way, an operator may recognize that the patient support apparatus 20 is not configured for use with the device, or that a potential attack to gain unauthorized access is underway or was attempted.

In one embodiment, the profile monitor 126 may monitor communications with respect to an external server, which is potentially in communication with other patient support apparatuses 20 and/or other devices in the health care realm. If the external server is determined to be an unauthorized device based on an operating signature of the external server failing to correspond to a device signature stored in memory, the control system 50 may take mitigation steps with respect to the external server. Additionally, or alternatively, the control system 50 may notify the other devices in communication with the external server of the failure to correspond to a device signature stored in memory. The failure may pertain to a malfunction of the external server, a compromised external server, or a non-compliant external server. In one embodiment, in response to detecting communications from an unauthorized device, the control system 50 may take mitigation steps to prevent such communications from being passed on to other devices connected to the control system 50 (e.g., the control system 50 may block the communications from passing through the control system 50).

An example failure mode in which an external server or device is identified as being unauthorized includes the network transceiver board 92 encountering requests that do not align with any stored device signatures 175, such as requests being received at an unknown frequency. If no device signature 175, including service signatures 177, correspond to the unknown frequency of requests, the control system 50 may direct the network transceiver board 92 to shut off a connection to the device and generate a notification of the unauthorized device (e.g., a faulted device or an unwanted device).

It is noted that a control system 50 in accordance with one embodiment may take mitigation steps in response to detection of an unwanted device being coupled to an interface of the control system 50. One type of mitigation step includes shutting off the interface 132 or a portion thereof (e.g., power and/or data). The control system 50 in one embodiment may be configured to reactivate all or portions of the interface 132 to determine if the unauthorized device is still present. This reactivation may be conducted a period of time after mitigations steps were taken, and potentially periodically until the unauthorized device is no longer detected. In this way, mitigations steps taken by the control system 50 may not be persistent and the control system 50 is operable to recover from a fault state associated with detection of an unauthorized device.

In one embodiment, the profile monitor 126 in conjunction with the main microcontroller 82 may conduct a test with respect to a subsystem to determine whether it is an authorized device or has faulted. For instance, if the profile monitor 126 receives an indication there may be an issue with the propulsion control board 60, the main microcontroller 82 (e.g., main controller) and/or the profile monitor 126 may initiate a test set of commands in order to obtain an operating signature of the propulsion control board 60 and compare the operating signature to a device signature stored in memory. If the operating signature of the propulsion control board 60 satisfies some but not all criterion of a device signature for the propulsion control board 60, the profile monitor 126 may identify the propulsion control board 60 as being unauthorized (e.g., an unwanted or faulted device.) As another example, if the device connected to an interface 132 of the control system indicates that it is a brake controller of the electric brake 72, the control system 50 may present a known task to the device, such as a disengagement command. If the device does not respond in a manner to yield an operating signature, including an operating data signature, that corresponds to the device data signature stored in memory for the brake controller of the electric brake 72, the profile monitor 126 may identify the device as being unauthorized, and the control system 50 may stop further movement of the patient support apparatus 20 and lock the system down.

The control system 50 may prevent further operation of the patient support apparatus 20 in response to a determination of an unauthorized device (e.g., an unwanted or faulted device) being connected to an interface 132 of the control system 50. A notification may be generated to a maintenance handler to inspect the issue further. For instance, if an unauthorized USB device is coupled to a USB interface of the control system 50, the control system 50 in conjunction with the profile monitor 126 may communicate a notification of the connection of the unauthorized USB device to a maintenance handler.

As described herein, if the information provided by a weight scale and included in an operating signature does not correspond to the device data profile 176, the weight scale may be identified as an unauthorized device. Even if the information corresponds to the device data profile 176, one or more additional device data profiles 176, such as the time between a request and a response for communication pertaining to the sensed weight report, may be provided in the device service signature 177 associated with reporting a sensed weight. In this example, an operating signature determined by the profile controller 170 may include a format of the information provided by the weight scale and the timing of communications associated with the information provided by the weight scale. These two characteristics—format and timing—may correspond to two device data profiles 176 of the device service signature 177 for the weight scale service, and both characteristics in the operating signature may be compared respectively to the two device data profiles 176 to determine correspondence and whether the weight scale device is an authorized device or an unauthorized device.

In the weight scale example, power information may be obtained by the profile controller 170 and included in the operating signature of the weight scale. This power information may be measured or obtained during operation of the weight scale service, and may be compared against characteristic information of a device power profile 178 in the form of power demand during the weight scale service and associated with the device service signature 177 for the weight scale service. The operating signature determined or obtained by the profile controller 170 may be compared against zero or more device data profiles 176 and zero or more device power profiles 178 of the device service signature 177 to determine if the weight scale is authorized. This type of analysis may be conducted periodically or continuously with respect to each service associated with the device, such that the profile controller 170 may determine if an operating signature of the device is consistent with each device service signature 177 associated with the device, thereby determining that the operating signature of the device is consistent with the device signature 175.

Additional examples of services associated with a weight scale device include but are not limited to a device information service, a user data service, a body composition service, a battery service, and a current time service.

The device service signature 177 may include one or more device data profiles 176 and one or more device power profiles 178 for specific functions 179 associated with a service of the device. It is to be understood that the device service signature 177 may include one or more device data profiles 176 without one or more device power profiles 178, or one or more device power profiles 178 without one or more device data profiles 176. Example functions 179 associated respectively with a service signature 177*b*, d-s of a device coupled to the control system 50 are depicted in the illustrated embodiment of FIG. 7.

It is noted that, for purposes of disclosure, the device signature 175, the device service signature 177, the device data profile 176, and the device power profile 178 are described in conjunction with determining authorization with respect to a device coupled to an interface 132 of the control system 50. It is to be understood that these signatures and profiles may be profiled for one or more roles associated with a device or system. For instance, in the case of a server device having multiple roles, such as multiple programs running in shared memory space, one role of the service device may be authorized while another role may be identified as unauthorized.

The device power profile 178 of the device signature 175 in accordance with one embodiment may be compared to an operating power signature obtained with respect to an interface 132. If the operating power signature corresponds to a device power profile 178 of a device signature 175, a device connected to the interface 132 may be determined to be authorized, at least with respect to the power signature, for use with the system. If other aspects of the device signature 175 are inconsistent with an operating signature of the device, the device may still be considered unauthorized.

As an example, on startup, devices, such as wireless headwall boards of the patient support apparatus, may perform one or more functions that draw current in a predictable manner. For instance, the wireless headwall boards may flash an LED at a certain frequency, causing a recognizable amount of power draw from the interface 132 at a specific time or period of time after startup (e.g., 1-2 mA in the initial 5 s of power up). The profile monitor 126 may be configured to detect this power draw during the initial power period as an operating signature, and to compare this operating signature to a stored signature to determine the device is authorized. The operating signature may be a function of device design parameters, including design considerations built into the device for purposes of aiding identification of the device. For instance, the device may be configured to draw power in a manner (e.g., a pattern) that facilitates providing the device with an operating signature that is distinguishable from other types of devices. Additionally, or alternatively, the device may include one or more components that respond in an identifiable manner to a stimulus or power provided by the control system 50. For instance, the device may include a capacitor configuration (e.g., a high pass capacitor configuration) having an impedance that is recognizable with respect to power supplied to the device (e.g., an increase in current draw above a high pass corner frequency associated with a high pass capacitor configuration.)

In one embodiment, the power draw or power signature for a device may provide a pattern corresponding to information transmitted from the device to the profile monitor 126 of the control system 50. This information may provide the basis for encryption and/or validation of data transmitted between the control system 50 and the device. Additionally, or alternatively, the power signature for a device may vary from application to application and operation to operation, and may form a dynamic basis (e.g., a dynamic key) for encryption and/or validation of data communicated with the device.

To provide another example, the control system 50 may provide an interface 132 as described herein for connection to a specific type of approved device, such as a pump. The interface 132 may provide power, such as AC power, for the device. Optionally, as described herein, the interface 132 may provide data in conjunction with power. The power connection provided by the interface 132 may enable connection of multiple types of devices, despite being made available for connection to the specific type of approved device. As result, an operator such as a nurse may connect a type of device (e.g., an unauthorized pump) that can cause a fault or damage to a power supply of the control system 50 supplying power to the interface 132.

It is noted that a pump motor of a type of pump may draw power in a manner that is recognizable and distinguishable from other types of devices and other types of pumps. For instance, the pumps supplied by one manufacturer may be distinguishable based on power usage with respect to the pumps supplied by another manufacturer. Pump offerings by the same manufacturer may also be distinguishable from each other. The profile monitor 126 may store a device signature 175 for an authorized pump, and sense the supply of power (or a characteristic thereof) to an interface 132 provided for the authorized pump. If the sensed output corresponds to the device signature 175 for the authorized pump, the control system 50 may allow the pump to continue to draw power from the interface 132. However, if the sensed output does not correspond to the device signature 175 for an authorized pump, the control system 50 may shut off power to the interface 132 in an effort to protect against a fault or damage due to connection of an unrecognized or unauthorized device. This way, an operator intent on connecting an unauthorized device to the interface 132 may be prevented from doing so effectively. For instance, if the unauthorized device may blow a fuse or trip a breaker, the unauthorized device may be detected as being unauthorized and power supply to the device may be discontinued before the fuse blows or the breaker trips.

In another example, the interface 132 may be operable to provide communication access to the control system 50 in accordance with one embodiment, and the authorized device may be a diagnostic device (e.g., a test tool) operable to communicate commands to and obtain information from the control system 50.

In one embodiment, the profile monitor 126 may be operable to detect such communications emanating from and directed to the diagnostic device to determine whether a detected communication profile or operating signature of the diagnostic device is consistent with a stored device signature for the diagnostic device. In one embodiment, the profile monitor 126 may not be configured to detect which interface is providing communications with respect to the diagnostic device in the case of a shared communication bus; however, the profile monitor 126 may be operable to detect the communications with respect to the diagnostic device and determine if the shared bus is connected to an unauthorized device if communications are inconsistent with a stored device signature.

Additionally, or alternative to comparing communications pertaining to the diagnostic device, if the diagnostic device couples to the interface 132 and obtains power therefrom (potentially in addition to communicating with the control system 50), a sensed power signature of the diagnostic device may be compared to a stored power signature or device signature to determine if the diagnostic device is recognized as an authorized device. If an operating signature of the device coupled to the interface 132 is not recognized as a stored device signature, the control system 50 may shut off the power to the interface 132 and/or prevent communication access to the interface 132. As a result, the unauthorized device connected to the interface 132 may be prevented from drawing power and/or communicating with the control system 50.

In one embodiment, the device coupled to an interface of the control system 50 may be operable to query for information or data pertaining to a patient of the patient support apparatus. Because the profile monitor 126 may obtain an operating signature of the device (such as an operating power signature and an operating data signature), the profile monitor 126 may determine that the device is authorized with respect to the query for information.

To form an attack against a control system 50 in accordance with one embodiment, the device operating signature (e.g., one or both of the operating power signature and the operating data signature) of a device would need to correspond to a stored device signature, which is considered unlikely and sufficiently impractical to be a viable attack vector. Vendors may need to obtain a certification from the manufacturer of the control system 50 in order to obtain approval for functioning with the control system 50. This may protect the control system 50 from devices being connected to the control system 50 and operating in a manner that is incompatible with capabilities of the control system 50, thereby potentially causing fault and/or failure conditions.

In one embodiment, as described herein, the control system 50 may authenticate a device based on an operating signature of the device. For instance, the control system 50 may authenticate a device based on an operating signature of power (or a characteristic thereof) supplied to the device via an interface 132, and sensed by the profile monitor 126. Authentication may be based on correspondence between the operating signature of the device corresponding to a stored signature for a device. Additionally, or alternatively, authentication may be based on data derived from the operating signature (e.g., a key or signature) and based on data obtained from the device being validated or decrypted with the data derived from the operating signature.

An interface 132 in one embodiment described herein may be internal or external to the control system 50. For instance, the interface 132 may be an internal interface for connection to a subsystem of the control system 50. As another example, the interface 132 may be an external interface for connection to a device or control system 50 external to the patient support apparatus 20. Another example of an external interface is an interface provided by an external device coupled to an external interface of the control system 50, in which case the control system 50 may be operable to identify the external device as authorized or unauthorized and/or a device connected to the external interface of the external device as being authorized or authorized. Yet another example of an external interface includes a wireless interface provided by the control system 50 or a device coupled to an interface 132 of the control system 50, including, for instance, an external device having a wireless data connection to a WiFi interface provided by the control system 50 or a device coupled thereto.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A patient support apparatus comprising:
a litter frame;
a support deck supported on the litter frame and adapted to support a patient thereon;
a power source adapted to provide power to the patient support apparatus;
a peripheral device adapted to control a state of the patient support apparatus, the peripheral device having an operative signature; and
a control system operatively coupled to the peripheral device, the control system adapted to receive electrical power from the power source, the control system adapted to determine the peripheral device is authorized for the patient support apparatus based on the operative signature corresponding to a baseline operative signature stored in memory, wherein the baseline operative signature identifies an expected characteristic of the power drawn by the peripheral device from the power source.

2. The patient support apparatus of claim 1 wherein the power source includes at least one of an Alternating Current (AC) connector adapted to receive electrical power from an AC outlet and a battery adapted to provide power to the patient support apparatus.

3. The patient support apparatus of claim 1 wherein the peripheral device is a motorized actuator adapted to change the state of the patient support apparatus by moving at least a portion of the support deck.

4. The patient support apparatus of claim 1 wherein the peripheral device includes a peripheral control system adapted to control the state of the patient support apparatus.

5. The patient support apparatus of claim 4 wherein the peripheral device includes a communication interface operable to facilitate communications between the peripheral control system and the control system.

6. The patient support apparatus of claim 5 wherein the operative signature is also based on the communications between the peripheral control system and the control system.

7. The patient support apparatus of claim 5 wherein the operative signature is also based on communications pertaining to a change in the state of the patient support apparatus.

8. The patient support apparatus of claim 7 wherein the operative signature also includes data and timing information with respect to communications pertaining to the change in state of the patient support apparatus.

9. The patient support apparatus of claim 4 wherein the peripheral device includes a user interface operable to initiate transmission of a command to the control system to change the state of the patient support apparatus.

10. The patient support apparatus of claim 1 wherein the expected characteristic is a power demand of the peripheral device with respect to a period of time corresponding to a change in the state of the patient support apparatus.

11. A patient support apparatus comprising:
a litter frame;
a support deck supported on the litter frame and adapted to support a patient thereon;
a plurality of motorized actuators adapted to move a plurality of components of the patient support apparatus;
a user interface including a display for displaying information to a user;
a main control board including a main controller;
a mattress control board adapted to control a mattress positioned on top of the support deck, the mattress control board including a mattress microcontroller and a mattress transceiver adapted to receive messages from the main control board used to control the mattress;
a motion control board adapted to control movement of the plurality of motorized actuators, the motion control board including a motion microcontroller and a motion transceiver adapted to receive messages from the main control board used to control the plurality of motorized actuators;
a display control board adapted to control content displayed on the display of the user interface, the display control board including a display microcontroller and a display transceiver adapted to receive messages from the main control board used to control the display; and
wherein the main controller is operable to determine a mattress control board signature, a motion control board signature, and a display control board signature respectively for the mattress control board, the motion control board, and the display control board, wherein the main controller is operable to determine the mattress control board, the motion control board, and the display control board are authorized devices for the patient support apparatus based on each of the mattress control board signature, the motion control board signature, and the display control board signature corresponding to at least one of a plurality of baseline signatures stored in memory.

12. The patient support apparatus of claim 11 wherein the mattress control board baseline signature, the motion control board baseline signature, and the display control board baseline signature each include a power characteristic of the power drawn by the mattress control board, the motion control board, and the display control board, respectively.

13. A patient support apparatus comprising:
a litter frame;
a support deck supported on the litter frame and adapted to support a patient thereon;
a power source adapted to provide power to the patient support apparatus;
a peripheral device adapted to control a state of the patient support apparatus, the peripheral device having an operative signature; and
a control system operatively coupled to the peripheral device, the control system adapted to receive electrical power from the power source, the control system adapted to determine the peripheral device is authorized for the patient support apparatus based on the operative signature corresponding to a baseline operative signature stored in memory, wherein the baseline operative signature includes data and timing information with respect to communications pertaining to the change in state of the patient support apparatus.

14. The patient support apparatus of claim 13 wherein the peripheral device is a motorized actuator adapted to change the state of the patient support apparatus by moving at least a portion of the support deck, and wherein the operative signature also includes a power characteristic of the motorized actuator.

15. The patient support apparatus of claim 13 wherein the peripheral device includes a peripheral control system adapted to control the state of the patient support apparatus.

16. The patient support apparatus of claim 13 wherein the peripheral device includes a communication interface operable to facilitate communications between the peripheral control system and the control system.

17. The patient support apparatus of claim 13 wherein power for the peripheral device is supplied via the power source, wherein the control system is operable to obtain a power characteristic of power supplied to the peripheral device, and wherein the operative signature also includes the power characteristic.

18. The patient support apparatus of claim 17 wherein the power characteristic is a power demand of the peripheral device with respect to a period of time corresponding to a change in the state of the patient support apparatus.

19. The patient support apparatus of claim 13 wherein the peripheral device includes a user interface operable to initiate transmission of a command to the control system to change the state of the patient support apparatus.

* * * * *